(12) United States Patent
Suzuki et al.

(10) Patent No.: US 6,822,684 B1
(45) Date of Patent: Nov. 23, 2004

(54) IMAGE SIGNAL RECORDING SYSTEM AND OPTICAL DEVICE

(75) Inventors: Noboru Suzuki, Utsunomiya (JP); Akira Senda, Tokyo (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 09/281,525

(22) Filed: Mar. 30, 1999

(30) Foreign Application Priority Data

| Apr. 3, 1998 | (JP) | ............................................ 10-091446 |
| Jul. 8, 1998 | (JP) | ............................................ 10-192898 |

(51) Int. Cl.⁷ ......................... H04N 5/225; H04N 5/232; H04N 9/04
(52) U.S. Cl. ................. 348/335; 348/211.1; 348/207.99
(58) Field of Search ................................. 348/357, 360, 348/375, 335, 211.11, 211.13, 333.07, 240.99, 240.3, 211.1, 211.4, 207.99, 211.99

(56) References Cited

U.S. PATENT DOCUMENTS

| 4,404,595 A | * | 9/1983 | Ushiro et al. ................. 348/375 |
| 4,544,959 A | * | 10/1985 | Kozuki et al. ................ 386/119 |
| 4,908,647 A | * | 3/1990 | Ueyama ....................... 396/135 |
| 4,945,424 A | * | 7/1990 | Hiroki et al. ............ 348/333.13 |
| 5,008,756 A | * | 4/1991 | Nakamura et al. ........ 348/211.1 |
| 5,075,709 A | * | 12/1991 | Ueyama ....................... 396/78 |
| 5,303,062 A | * | 4/1994 | Kawarai et al. ............. 348/373 |
| 5,517,266 A | * | 5/1996 | Funaki et al. ................ 396/319 |
| 5,568,192 A |   | 10/1996 | Hannah ....................... 348/222 |
| 5,826,117 A | * | 10/1998 | Kawamura et al. .......... 348/357 |
| 6,130,717 A | * | 10/2000 | Arai et al. ................... 348/360 |
| 6,172,709 B1 | * | 1/2001 | Yamano et al. .............. 348/360 |

FOREIGN PATENT DOCUMENTS

| EP | 0 424 678 A2 | 9/1990 |
| EP | 0 424 678 A1 | 5/1991 |
| EP | 0 674 435 A1 | 2/1995 |
| EP | 0 742 472 A1 | 11/1996 |
| EP | 0 888 002 A2 | 6/1998 |

* cited by examiner

*Primary Examiner*—Andrew Christensen
*Assistant Examiner*—Nhan Tran
(74) *Attorney, Agent, or Firm*—Morgan & Finnegan, LLP

(57) ABSTRACT

There is disclosed a command-answer type serial communication device between TV lens and TV camera, or between TV lens and accessory. In the command-answer type serial communication, answer data is transferred in response to a command in ordinary communication, but data to be processed at high speed on the side of a device having transferred the command is transmitted to a camera from a lens even if no command is transmitted, so that high-speed communication can be performed.

33 Claims, 24 Drawing Sheets

FIG. 3

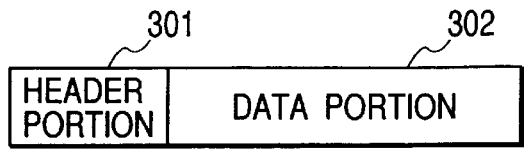

FIG. 4

| [CONTENT] | [HEADER PORTION] | [DATA PORTION] | | |
|---|---|---|---|---|
| FOCUS LENS POSITION INFORMATION REQUEST | 10H | NON | | |
| FOCUS LENS POSITION INFORMATION | 20H | FOCUS LENS POSITION DATA | | |
| SW INFORMATION REQUEST | 11H | NON | | |
| SW INFORMATION | 21H | SW DATA | | |

[IN CASE OF COMBINED REQUEST]

| | | | | |
|---|---|---|---|---|
| FOCUS LENS POSITION AND SW INFORMATION REQUEST | 12H | NON | | |
| FOCUS LENS POSITION AND SW INFORMATION REQUEST | 20H | FOCUS LENS POSITION DATA | 21H | SW DATA |

ALLOCATION OF SW DATA

| BIT | 7 | 6 | 5 | 4 | 3 | 2 | 1 | 0 |
|---|---|---|---|---|---|---|---|---|
| | SW6 | SW5 | SW4 | SW3 | SW2 | SW1 | RET.SW | VTR.SW |

1 : ON
0 : OFF

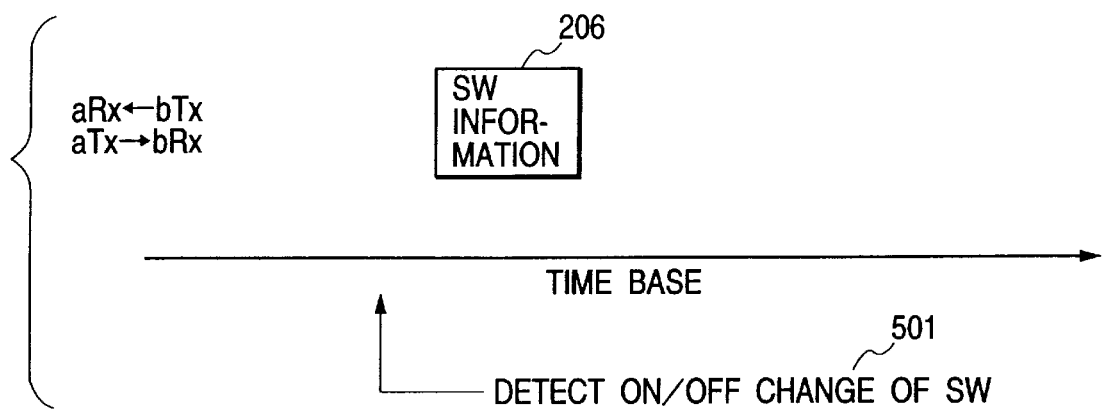
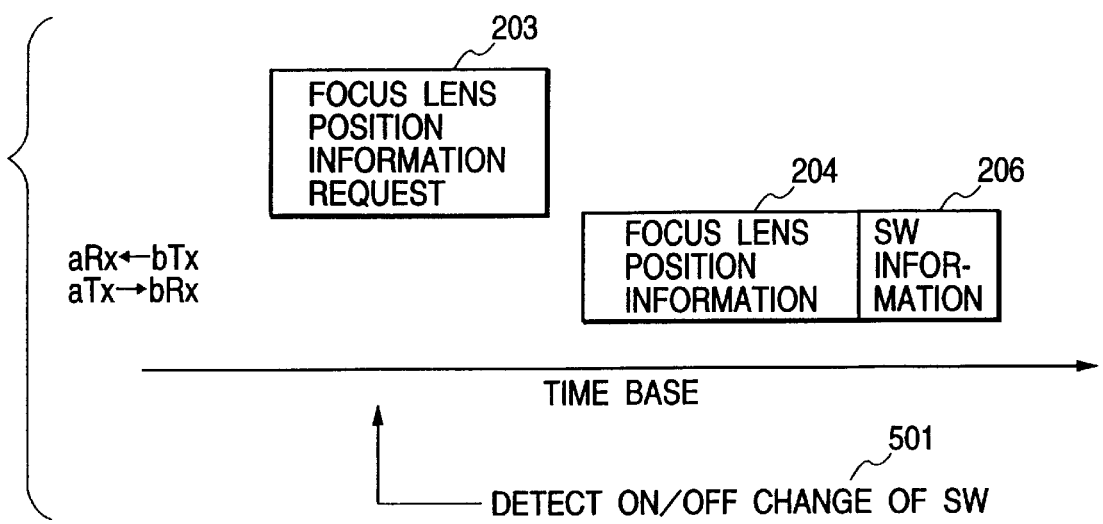

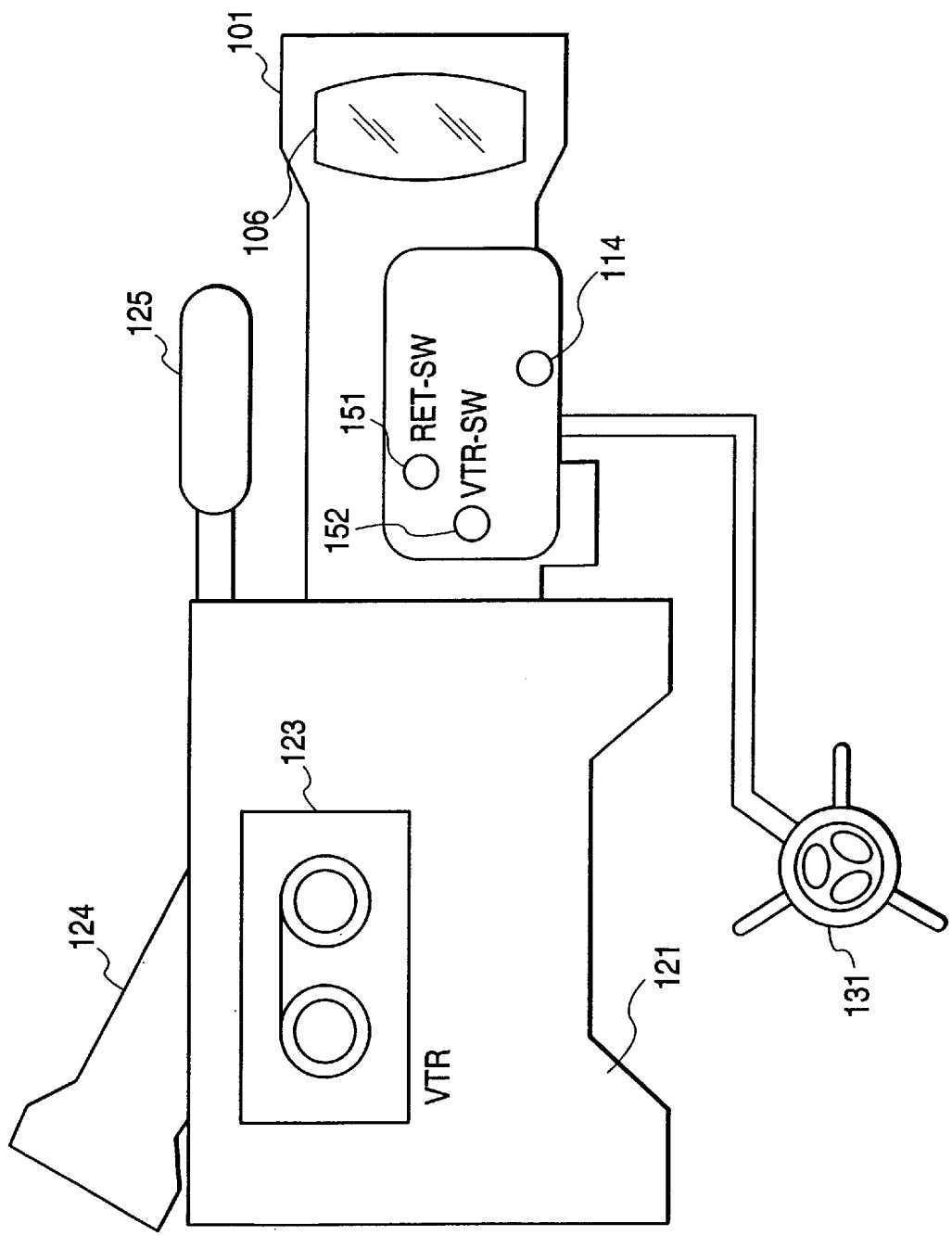

PRIOR ART

IMAGE SIGNAL RECORDING SYSTEM AND OPTICAL DEVICE

BACKGROUND OF THE INVENTION

1. Field of the Invention

The present invention relates to communication between a television camera lens or other optical accessories for television shooting and a camera or other optical devices.

2. Related Background Art

In a conventional television broadcasting system, communication is performed with an analog signal as an camera-lens interface. For example, a lens system is controlled by designating to a lens a voltage for determining a position of focus lens or IRIS or determining a zoom lens speed. Conversely, lens information is transmitted by sending to a camera side a voltage indicating the position of focus lens, zoom lens or IRIS. On the other hand, in the lens, a feedback system using a potentiometer as a position sensor is constituted to form an analog servo control system.

In this case, in a conventional electric television lens and camera interface, one connector pin is allocated to each function. Specifically, for example, an iris control signal for controlling a television lens diaphragm from the television camera uses a fifth pin of a 12-pin connector between television lens and camera.

FIG. 35 is a block diagram of a conventional electric interface of television lens and camera.

A TV lens 5001 and TV camera 5002 are electrically connected via a connector 5003. When the electric interface is viewed from TV camera 5002, a switch input signal 5004 from a switch (not shown) in TV camera 5002 and an analog input signal 5005 generated by TV camera 5002 are transmitted to TV lens 5001. The TV lens 5001 transmits an analog output signal 5006 and a switch output signal 5007 to TV camera 5002.

An inside of TV lens 5001 will be described.

The switch input signal 5004 is connected to a signal processing circuit 5011 via a buffer 5008 in the TV lens 5001 to operate a function in the TV lens.

The analog input signal 5005 is transmitted to the signal processing circuit 5011 via an amplifier 5009. The analog input signal operates each function of TV lens 5001 such as an iris, zoom, focus, extender and the like (not shown). A motor 5013 for each function is operated via a motor driving circuit 5012 in response to a signal from the signal processing circuit 5011. Information indicating each function state of TV lens 5001 is obtained from a potentiometer 5014 operatively connected to the motor 5013, and transmitted as the analog output signal 5006 to the TV camera 5002 from the signal processing circuit 5011 via an amplifier 5010. Information of switch (SW) 5015 in the TV lens 5001 is transmitted as the switch output signal 5007 to the TV camera 5002.

Additionally, in the recent TV broadcasting, TV images clearer than before have been demanded, and not only the conventional items of TV camera-lens interface but also, for example, detailed lens information items need to be transmitted to the TV camera.

However, since no vacant connector pin is present between TV lens and camera, the conventional electric TV camera-lens interface cannot meet these demands.

Moreover, even if TV lens and camera using a new electric interface are provided from now on, they need to be combined for use with the conventional type TV lens and camera presently owned by a user.

SUMMARY OF THE INVENTION

According to one aspect of the present invention, there is provided a photographing system and an optical device. In the photographing system a serial communication of a request command and information is performed between a first device constituting the photographing system and a second device electrically connected to the first device, and the information is serially transmitted to the first device from the second device based on the request command from the first device. The second device is provided with a signal generating section for forming a signal independent of the request command, and the signal from the signal generating section is transmitted to the first device via a communication line provided independent of the serial communication. Thereby, various information items are transmitted in the serial communication without increasing the number of terminals. Additionally, when the information is transmitted at a high speed, the information is transmitted at a high speed via the communication line independent of the serial communication.

According to another aspect of the present invention, there is provided a photographing system and an optical device. In the photographing system a serial communication of a request command and information is performed between a first device constituting the photographing system and a second device electrically connected to the first device, and the information is serially transmitted to the first device from the second device based on the request command from the first device. The second device is provided with a signal generating section for forming a signal independent of the request command, and predetermined information is transmitted to the first device by the signal from the signal generating section via the serial communication independent of the request command from the first device. Thereby, various information items are transmitted in the serial communication, and when high-speed communication is necessary, the information is transmitted to the first device from the second device in the serial communication without transmitting the request command.

Further aspect of the present invention provides a lens device provided with a plurality of terminals, and a parallel communicator for transmitting or receiving information with a photographing device via each of at least some terminals for use among the plurality of terminals. The lens device comprises a serial communicator in which a plurality of information items are transmitted to the photographing device or received from the photographing device by digital signals via at least one terminal of the plurality of terminals, so that communication of various information items is performed.

Other objects of the present invention are clarified by embodiments described hereinafter with reference to the drawings.

BRIEF DESCRIPTION OF THE DRAWINGS

FIG. 3 is a view of a serial communication data structure.

FIG. 4 is an explanatory view of a data content.

FIG. 5 is an explanatory view showing an emergency processing when there is no camera command.

FIG. 6 is an explanatory view showing an emergency processing when there is a camera command.

FIG. 7 is a schematic view showing a structure of camera and lens using the system structure of FIG. 1.

DETAILED DESCRIPTION OF THE PREFERRED EMBODIMENTS

Figure 1:
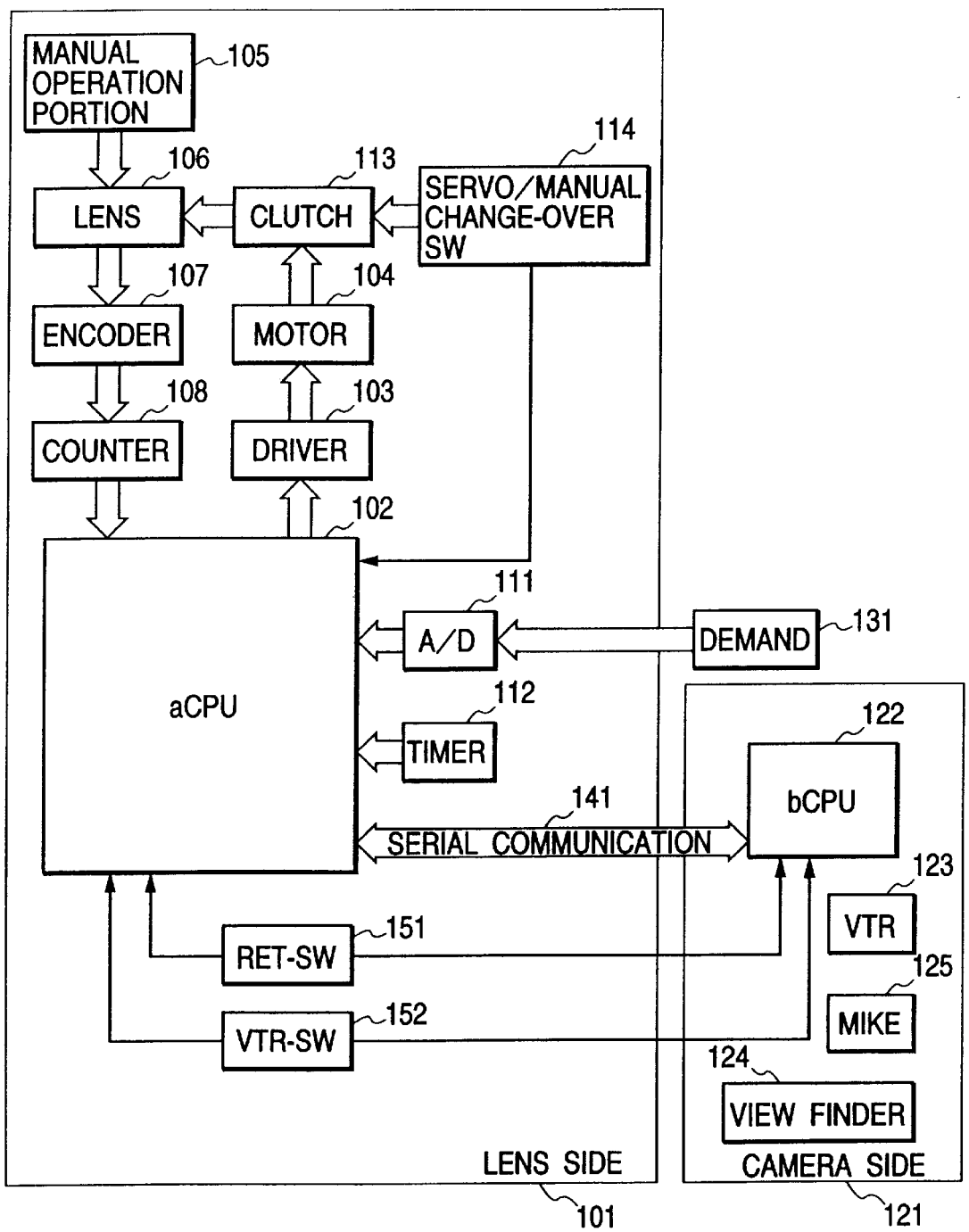
FIG. 1 is a system block diagram showing an entire structure of the present invention.

FIG. 1 is a block diagram of an optical device according to a first embodiment of the present invention. Numeral 101 denotes a lens side for photographing, and 121 denotes a camera side for photographing through an optical system of the lens side 101.

The lens side comprises a controller 102 (hereinafter referred to as aCPU) for controlling the lens side to perform a servo system control, a driver 103 for operating a motor 104, a clutch 113 for transmitting a drive force from the motor 104, and an optical lens 106 connected to the clutch 113. The clutch 113 is connected to a servo/manual change-over switch (hereinafter abbreviated as SMCHG-SW) 114 as an operation member for switching servo and manual modes of the optical lens 106. When the SMCHG-SW 114 is in the servo mode, the clutch 113 can transmit the drive force to the lens 106 from the motor 104. When the SMCHG-SW 114 is in the manual mode, the clutch 113 cannot transmit the drive force to the lens 106 from the motor 104. Since the SMCHG-SW 114 is also connected to the aCPU 102, it can be judged whether or not to operate the lens 106 in the servo mode.

The lens side also comprises an encoder 107 for detecting a position of the optical lens 106, a counter 108 for counting outputs from the encoder 107, and a timer 112. The timer 112 and counter 108 are connected to the aCPU 102, and the aCPU 102 uses a value of the counter 108 or the timer 112 to know the position or speed of the optical lens 106. Numeral 105 denotes a manual operation portion for manually operating the optical lens 106.

Moreover, the lens side 101 is connected to a demand command setting section 131. Since an A/D converter 111 for A/D converting a command of the demand command setting section 131 is connected, a demand command value for controlling the optical lens 106 can be transmitted to the aCPU 102.

A controller or microcomputer (hereinafter referred to as the bCPU) 122 is mounted on the camera side 121, so that a serial communication 141 is performed with the aCPU 102 of the lens side 101.

The camera side 121 further comprises a view finder 124 for monitoring a photographing image, VTR (recorder) 123 for recording the image, and a mike 125 for recording voice.

Moreover, the lens side 101 comprises a switch RET-SW 151 as an operation member for switching the image of the view finder 124, and a switch VTR-SW 152 as an operation member for starting VTR, which are connected to the aCPU 102. Furthermore, the RET-SW 151 and VTR-SW 152 can directly be connected to the camera side 121 via a line independent of the serial communication line, so that the switch information can directly be transmitted via the line. Additionally, since switch on/off information is transmitted via the line, high/low signal may be transmitted, or a voltage or another analog signal may be transmitted in accordance with a switch state. In this case, the bCPU 122 may respond to the analog signal via the A/D converter.

Figure 8:
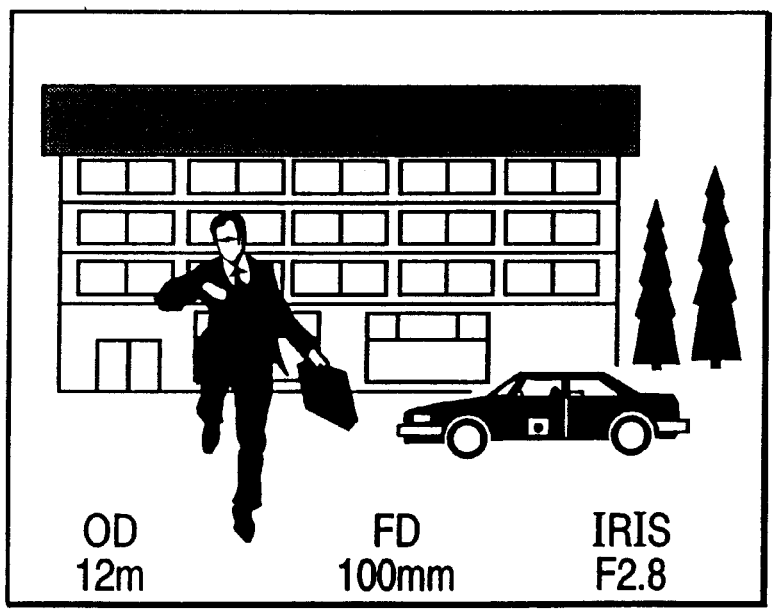
FIG. 8 is an explanatory view showing a display state in a finder.

FIG. 7 shows a photographing system image by the constitution shown in FIG. 1. Here, the camera side 121 may be connected to a studio control room (not shown), and a photographing system can be controlled by a controller called a camera control unit (not shown, hereinafter referred to as CCU). Furthermore, a plurality of photographing systems are connected to the studio control room, where an on-air image can be selected. Moreover, separate from the VTR 123 of the camera side 121, there are VTR for image from each photographing system, and VTR to be on the air in the studio control room, and recording can be performed on each VTR. As shown in FIG. 8, the photographing image or the on-air image can be monitored in the view finer 124. Alternatively, an object distance (hereinafter referred to as OD), focus distance (hereinafter referred to as FD), IRIS position and the like can be displayed by the information from the lens side 101.

Figure 2:
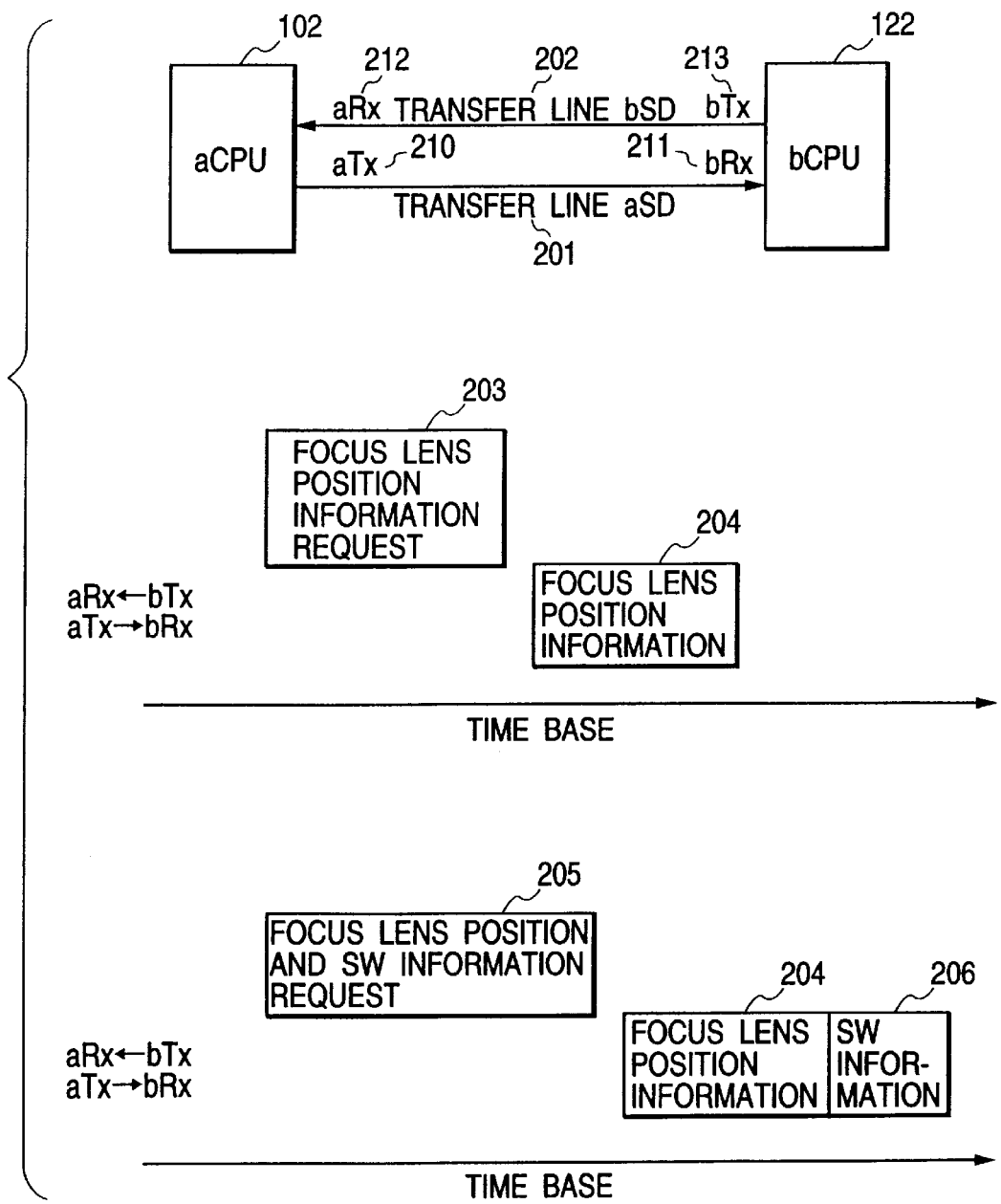
FIG. 2 is a serial communication diagram showing communication in FIG. 1.

The serial communication 141 between the aCPU 102 of lens side 101 and the bCPU 122 of camera side 121 will next be described with reference to FIG. 2, in which an example of the optical lens 106 of the lens side 101 as a focus lens will be described.

A serial data transmission terminal aTx 210 of aCPU 102 of lens side 101 is connected to a serial data reception terminal bRx 211 of bCPU 122 of camera side 121 via a transfer line aSD 201, so that information or commands of aCPU 102 can be transferred to the bCPU 122. Moreover, a serial data reception terminal aRx 212 of aCPU 102 of lens side 101 is connected to a serial data transmission terminal bTx 213 of bCPU 122 of camera side 121 via a transfer line bSD 202, so that information or commands of bCPU 122 can be transferred to the aCPU 102.

When the bCPU 122 of camera side 121 uses the transfer line bSD202 to transmit a command of focus lens position information request 203 to the terminal aRX 212 of aCPU 102 of lens side 101 via the terminal bTx 213, the aCPU 102 receives the command via the terminal aRx 212. As a result of judgment of command content, the aCPU reads focus lens position information from the counter 108, and uses the transfer line aSD 201 to transfer the value as focus lens position information 204 to the terminal bRx 211 of bCPU 122 via the terminal aTx 210.

Similarly, when the bCPU 122 transfers a command of focus lens position and SW information request 205 to the aCPU 102, the aCPU 102 judges the command, and transfers the focus lens position information 204 and SW information 206 to the bCPU 122.

A serial communication data structure will be described with reference to FIG. 3. Data is basically constituted of a header portion 301 and a data portion 302. The header portion 301 is set to eight bits, while the number of bits of data portion 302 is determined dependent on the header portion 301: for example, 16 bits for the focus lens position; and 8 bits for SW information.

An example of transfer content of the serial communication will be described with reference to FIG. 4.

(1) In case of the focus lens position information request, the header portion 301 has 10H, while the data portion 302 has none.

(2) In case of the focus lens position information, the header portion 301 has 20H, while the data portion 302 has focus lens position data with a length of 16 bits.

(3) In case of SW information request, the header portion 301 has 11H, while the data portion 302 has none.

(4) In case of SW information, the header portion 301 has 21H, and the data portion 302 has ON/OFF data with a length of 8 bits in which each SW information is allocated to each bit.

(5) In case of the focus lens position and SW information request (combined request), the header portion 301 has 12H, while the data portion 302 has none.

(6) In case of the information for the combined request, the header portion 301 and data portion 302 are combined for transfer information.

(7) Allocation of SW Information to each Bit
bit 0: VTR-SW 152
bit 1: RET-SW 151
bit 2: SW 1
bit 3: SW 2
bit 4: SW 3
bit 5: SW 4
bit 6: SW 5
bit 7: SW 6

In the allocation, switches (not shown) are allocated to SW 1 to SW 6. Moreover, each bit represents 1: ON, 0: OFF.

A case will be described with reference to FIG. 5, in which when no command is transmitted to the aCPU 102 of lens side 101 from the bCPU 122 of camera side 121, SW information is transferred at a high speed.

When no data is present on the transfer line bSD 202, it is determined that the aCPU 102 detects ON/OFF change of SW. Here, it is supposed that RET-SW 151 has an ON/OFF change, and changes to ON from OFF state.

The operation is generally performed when the image of view finder 124 of camera side 121 is to be changed over to the on-air image from the photographing image by a cameraman. The cameraman needs to quickly change over the image to soon confirm the on-air image.

Therefore, the bit 1 of SW information is set to 1 from 0, the SW information is transferred to the camera side 121, and the view finder 124 in the camera side 121 is changed over.

However, for the SW information, if there is no SW information request from the bCPU 122 of camera side 121, the aCPU 102 of the lens side 101 cannot transfer this, so that the image change-over of the view finder 123 is delayed.

To solve the problem, by carrying on the operation that the aCPU 102 transfers SW information to the bCPU 122 without SW information request from the bCPU 122, it is recognized in the camera side 121 that the image change-over of the view finder 124 is necessary, so that quick image change-over is realized.

Here, the bCPU 122 needs to judge what data is transmitted from the aCPU 102, but may simply judge the header portion 301 in the data structure of the serial communication. A case will be described with reference to FIG. 6, in which the command from the bCPU 122 of camera side 121 is being transferred to the aCPU 102 of lens side 101, and high-speed transfer of SW information is performed.

It is supposed that when data exists in the transfer line bSD 202, the aCPU 102 detects ON/OFF change of SW. The ON/OFF change is supposed to occur in VTR-SW 152, which changes to ON from OFF state. Moreover, the data of bSD 202 is the focus lens position information request 203.

The operation is generally performed when the image being photographed by the cameraman is recorded in VTR 123. Since the cameraman wants to soon record the image being photographing, he needs to quickly start the VTR 123.

Therefore, the bit 0 of SW information is set to 1 from 0, the SW information is transferred to the camera side 121, and recording on the VTR 123 in the camera side 121 needs to be started.

However, for the SW information, if there is no SW information request from the bCPU 122 of camera side 121, the aCPU 102 of the lens side 101 cannot transfer this, so that the recording of VTR 123 is delayed.

To solve the problem, by carrying on the operation that the aCPU 102 transfers SW information subsequent to the focus lens position information 204 to the bCPU 122 without SW information request from the bCPU 122, it is recognized in the camera side 121 that the recording of VTR 123 needs to be started, so that quick recording start is realized.

Here, the bCPU 122 needs to judge what data is transmitted from the aCPU 102, but in the same manner as the case of RET-SW 151, it can be known simply by decoding the header portion 301 that SW information is transferred together.

Communication algorithm will be described with reference to flowcharts. It is herein supposed that to process the serial communication 141 between the aCPU 102 of lens side 101 and the bCPU 122 of camera side 121, each CPU uses an interrupt processing.

First, a main processing of the lens side will be described with reference to FIG. 9. At step 901 a lens system is initialized. For example, in the lens side 101, a memory and port of aCPU 102 are initialized. When the encoder 107 is of a relative position output type, the lens 106 is driven to a predetermined position (e.g., a position where a mechanical end or an absolute position detecting SW exists) to obtain an absolute position of lens 106. When the absolute value is identified, the absolute position is set in the counter 108, or the timer 112 is started.

Subsequently, at step 911, a state of servo/manual change-over SW 114 is inspected. When the servo mode is set, the processing advances to step 902. At the step 902 a state of demand command setting section 131 is inputted via the A/D converter 111.

In step 903, PID control of lens 106 is performed in accordance with demand information. The PID control herein indicates an ordinary proportional, integrating, differentiating control. Since its content is different from the subject of the present invention, the description thereof is omitted.

At step 904, SW information of RET-SW 151, VTR-SW 152 or the like is inputted, and in step 905, each SW state is checked. When a state change is detected in at least one or more SW, the processing advances to step 906, in which ChgSwFlag=1, and further advances to step 908. Moreover, when no SW state change is detected in the step 905, the processing advances to step 907, in which ChgSwFlag=0, and further advances to step 908.

The SW state change herein indicates the change to OFF from ON state or the change to ON from OFF state. Moreover, in SW in which three values or more states exist, a change of the value (state) is similarly indicated.

At step 908, a state of flag ChgSwFlag is checked.

When ChgSwFlag=1, the processing advances to step 909 for transferring the SW information, and in step 901 ChgSwFlag=0. The processing then returns to step 911. Moreover, when ChgSwFlag=0 in the step 908, the processing returns to step 911.

In the step 911, when the servo/manual change-over SW 114 is set in the manual mode, the processing goes to step 912 for checking a drive state of lens 106. When the lens 106 is upon driving, the processing goes to step 913 for stopping the lens 106, and further goes to step 904. Moreover, when it is judged in the step 912 that the lens 106 is not driven, the processing goes to step 904. The lens 106 of lens side 101 herein indicates a focus lens, zoom lens or the like, but may be a movable member other than the lens, e.g., IRIS, extender or the like, or may be a panning, tilting or another movable member in a panning/tilting system. The drive command is not limited to the command from the demand 131, and may be a demand from accessories such as a shot box, operation panel/switcher and the like, further may be a command from the camera side 121. Since the drive command is analog, the A/D converter 111 is used, but a digital (parallel or serial) structure may be used. In the steps 904 to 909, the switch information is serially transmitted to the camera side by the cameraman's operation of the operation members of the lens side independent of the request from the camera.

A communication interrupt processing of lens side 101 will next be described with reference to FIG. 10. When there is a communication from the camera side 121, the lens side 101 enters a communication interrupt processing routine. First in step 1001 it is confirmed whether or not there is a command input from the camera side 121. When it is judged that there is no command, the processing goes to step 1007. Moreover, when it is confirmed that there is a command, the processing goes to step 1002.

It is checked at the step 1002 whether or not the command is a focus position information request. When it is judged to be focus position information request, the processing goes to step 1012 to transfer focus position information, and then goes to step 1007. When it is judged to be no focus position information request at step 1002, the processing goes to step 1003.

It is checked at step 1003 whether or not the command is SW information request. In case of the SW information request, the processing goes to step 1013 to transfer SW information. Furthermore, ChgSwFlag=0 in step 1023. The processing then goes to step 1007. When it is judged to be no SW information request at step 1003, the processing goes to step 1004. It is checked at step 1004 whether or not the command is a focus position and SW information request. In case of the focus position and SW information request, the processing goes to step 1014 to transfer focus position and SW information. Furthermore, ChgSwFlag=0 in step 1024. The processing then goes to step 1007. When it is judged to be no focus position and SW information request at step 1004, the processing goes to step 1005.

It is checked at step 1005 whether or not the command is a zoom position information request. In case of the zoom position information request, the processing goes to step 1015 to transfer zoom position information, then goes to step 1007. When it is judged to be no zoom position information request at step 1005, the processing goes to step 1006. It is checked at step 1006 whether or not the command is IRIS position information request. In case of the IRIS position information request, the processing goes to step 1016 to transfer IRIS position information, then goes to step 1007. When it is judged to be no IRIS position information request at step 1006, the processing goes to step 1007.

At the step 1007, flag ChgSwFlag is checked. In case of ChgSwFlag=1, at step 1017 SW information is transferred, and at step 1027 ChgSwFlag=0. Subsequently, communication interruption is completed. Moreover, in case of ChgSwFlag=0 at step 1007, communication interruption is completed. Here, for command judgment, the combined command is not limited to the focus position and SW information request, may be a zoom and focus position information request, or an IRIS position and SW information request, or may be a combined command of three or more requests such as a focus position, zoom position and SW information request.

Figure 9:
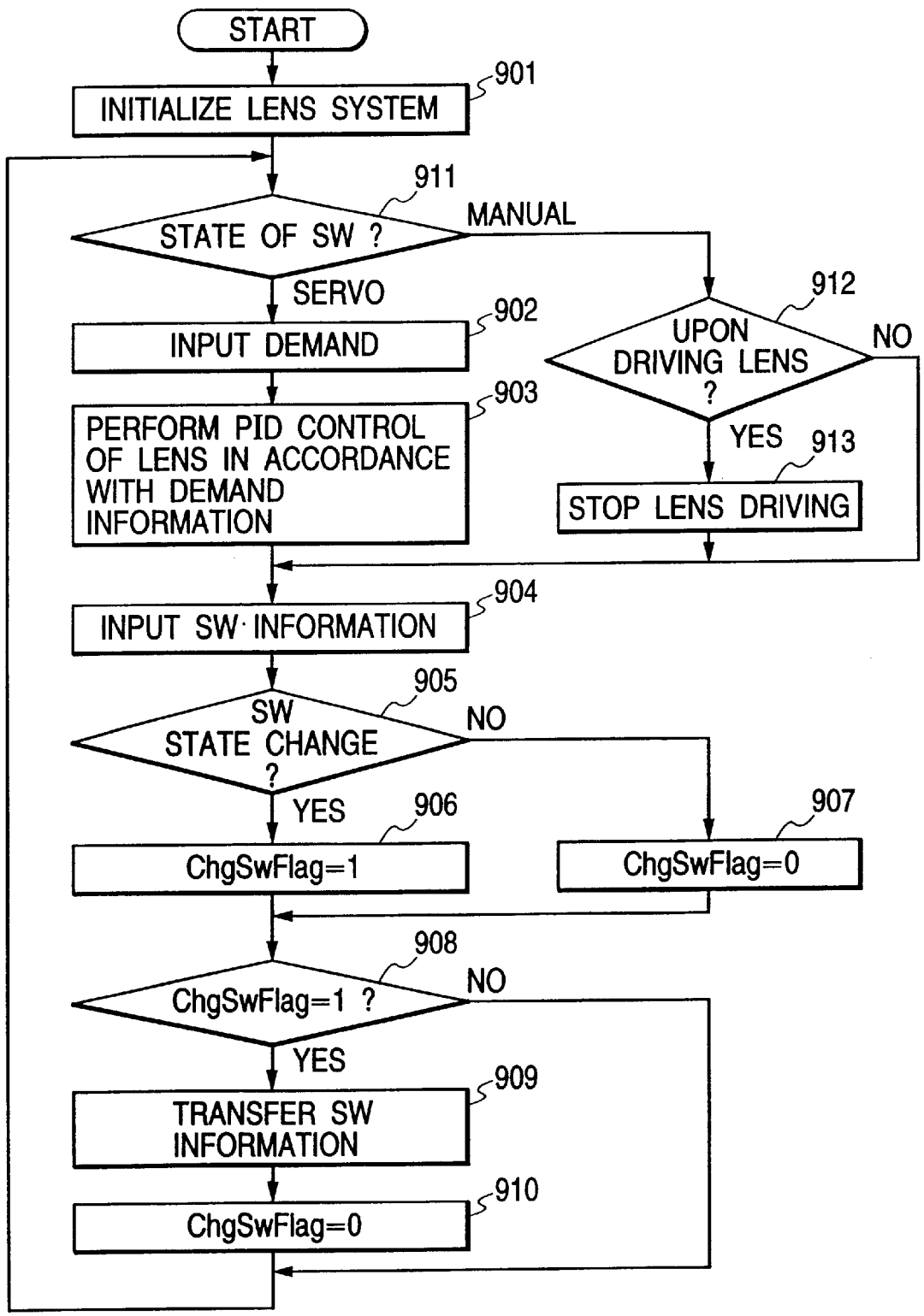
FIG. 9 is a flowchart of a main processing in a lens.
Figure 10:
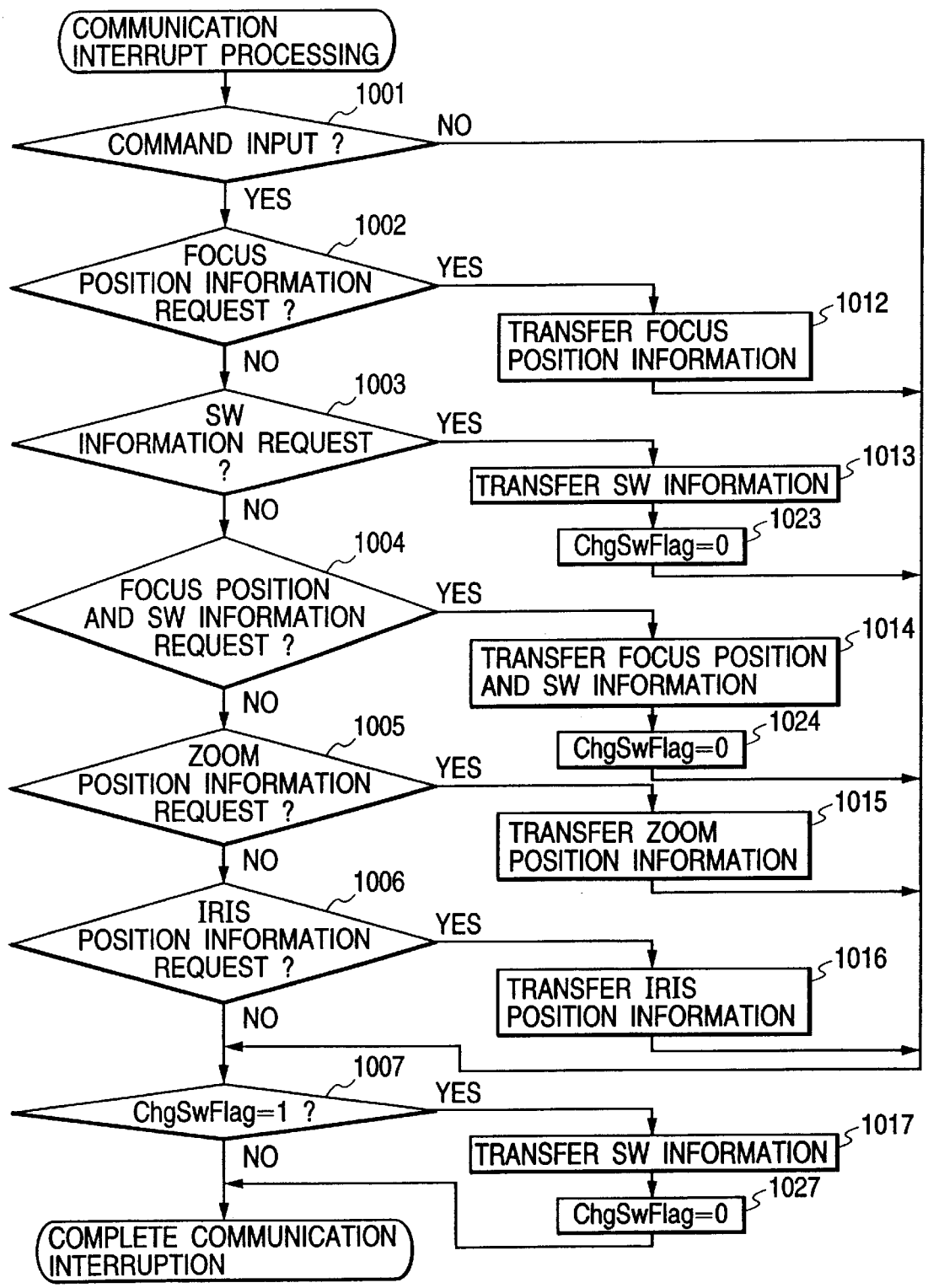
FIG. 10 is a flowchart of an interrupt processing in the lens.

Additionally, in the steps 1007, 1017, 1027, when the processing shifts to the interrupt processing of FIG. 10 immediately after the step 906 of FIG. 9 is performed, the SW information is transmitted by the interrupt processing even if there is no request command.

A flow or processing in the camera side 121 will next be described. A main processing of camera side will be described with reference to FIG. 14. In the camera side 121, after power supply is turned on, a camera system is initialized at step 1401.

Subsequently, it is checked at step 1402 whether or not VTR is operating. When VTR is operating, PID control of VTR is performed in step 1403. The processing then goes to step 1404. When it is judged in step 1402 that VTR is not operating, the processing goes to step 1404.

In the step 1404, distortion is corrected as a processing of image through the optical system of the lens side 101.

At step 1405, registration is corrected.

At step 1406, IRIS gain is calculated.

At step 1407, data of the lens side 101 is requested if necessary.

At step 1408, information of VTR-SW 152 is directly inputted without using the serial communication.

At step 1409, a sub-routine "VTR-SW process" is called based on the VTR-SW information inputted at the step 1408.

At step 1410, information of RET-SW 151 is directly inputted without using the serial communication. At step 1411, a sub-routine "RET-SW process" is called based on the RET-SW information inputted at the step 1410. The processing then returns to step 1402.

Figure 11:
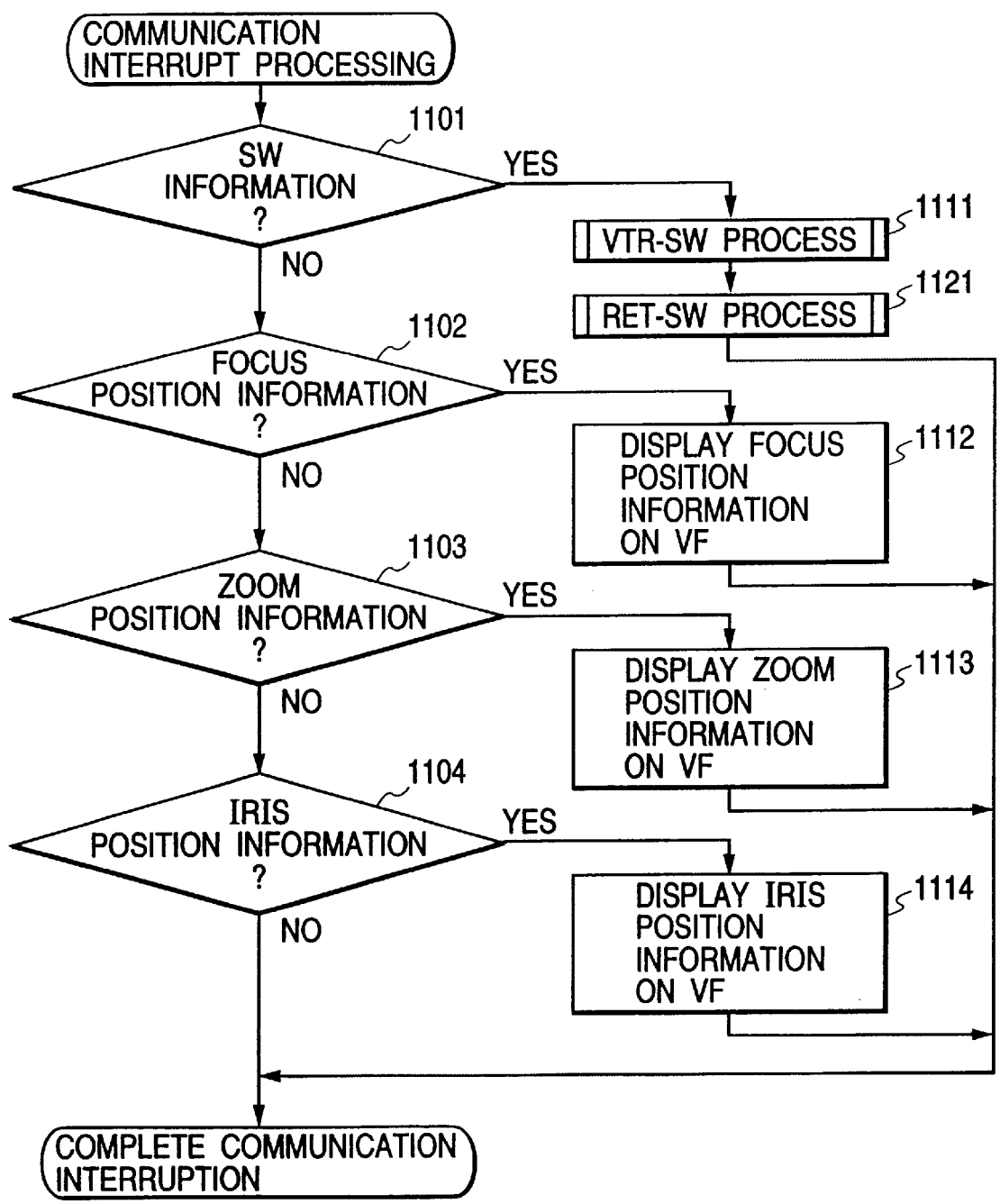
FIG. 11 is a flowchart of an interrupt processing in a camera.

In the steps 1408, 1410, the switch information can be transmitted to the camera directly from the switches 151, 152 without using the serial communication. A communication interrupt processing of the camera side 121 will next be described with reference to FIG. 11. First, it is judged at step 1101 whether or not input information is SW information. When it is judged to be SW information, the sub-routine "VTR-SW process" is called in step 1111. Furthermore, in step 1121 the sub-routine "RET-SW process" is called, and communication interruption is completed. Moreover, when it is judged to be no SW information at step 1101, the processing goes to step 1102.

It is checked at step 1102 whether or not the input information is focus position information. When it is judged to be focus position information, the focus position information is displayed on VF at step 1112, and communication interruption is completed. When it is judged to be no focus position information at step 1102, the processing goes to step 1103.

It is checked at step 1103 whether or not the input information is zoom position information. When it is judged to be zoom position information, the zoom position information is displayed on VF at step 1113, and the communication interruption is completed. When it is judged to be no zoom position information at step 1103, the processing goes to step 1104. It is checked at step 1104 whether or not the input information is IRIS position information. When it is judged to be IRIS position information, the IRIS position information is displayed on VF at step 1114, and the communication interruption is completed. When it is judged to be no IRIS position information at step 1104, the communication interruption is completed.

Figure 12:
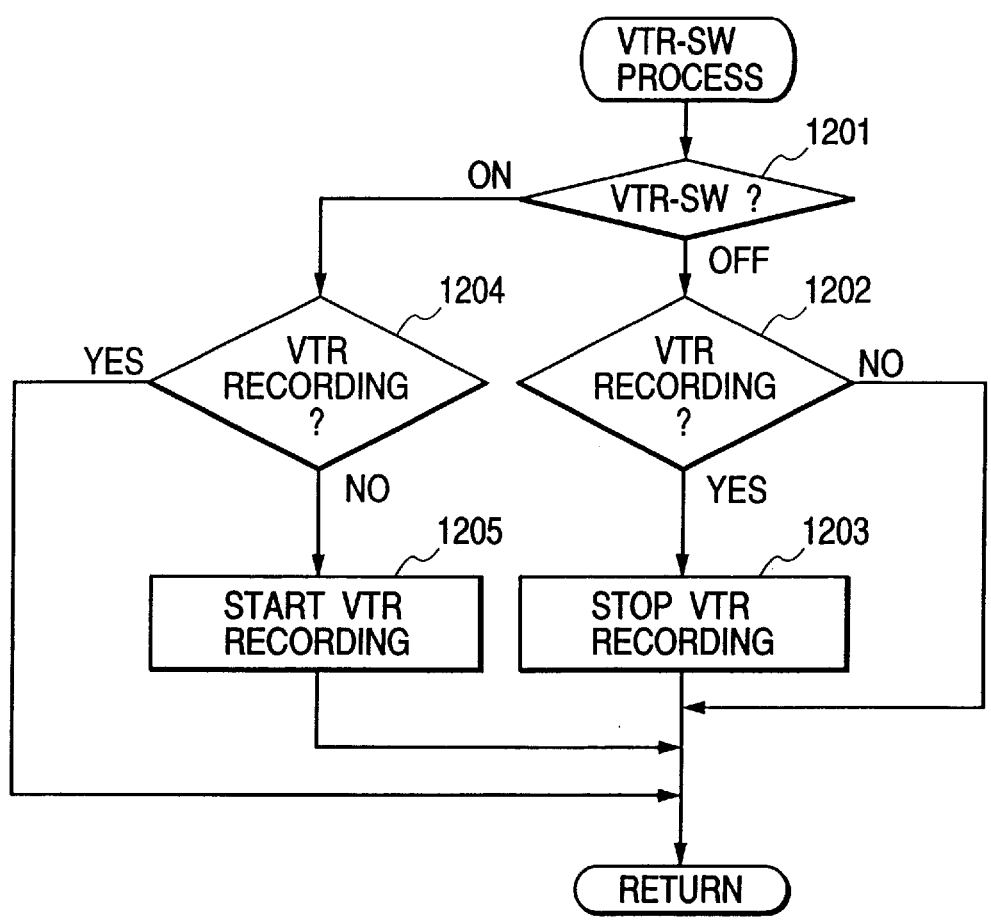
FIG. 12 is a flowchart of VTR-SW process.

The sub-routine "VTR-SW process" will next be described with reference to FIG. 12.

First, a state of VTR-SW is checked at step 1201. When it is judged to be ON state, the processing goes to step 1204. Moreover, when it is judged to be OFF state at step 1201, the processing goes to step 1202.

It is checked at step 1204 whether or not VTR is recording. When it is judged that VTR is recording, the sub-routine "VTR-SW process" is completed. Moreover, when it is judged at step 1204 that VTR is not recording, VTR recording is started at step 1205. The sub-routine "VTR-SW process" is then completed.

It is checked at step 1202 whether or not VTR is recording. When it is judged that VTR is recording, the processing goes to step 1203 to stop VTR recording, and the sub-routine "VTR-SW process" is completed. Moreover, when it is judged at step 1202 that VTR is not recording, the sub-routine "VTR-SW process" is then completed.

Figure 13:
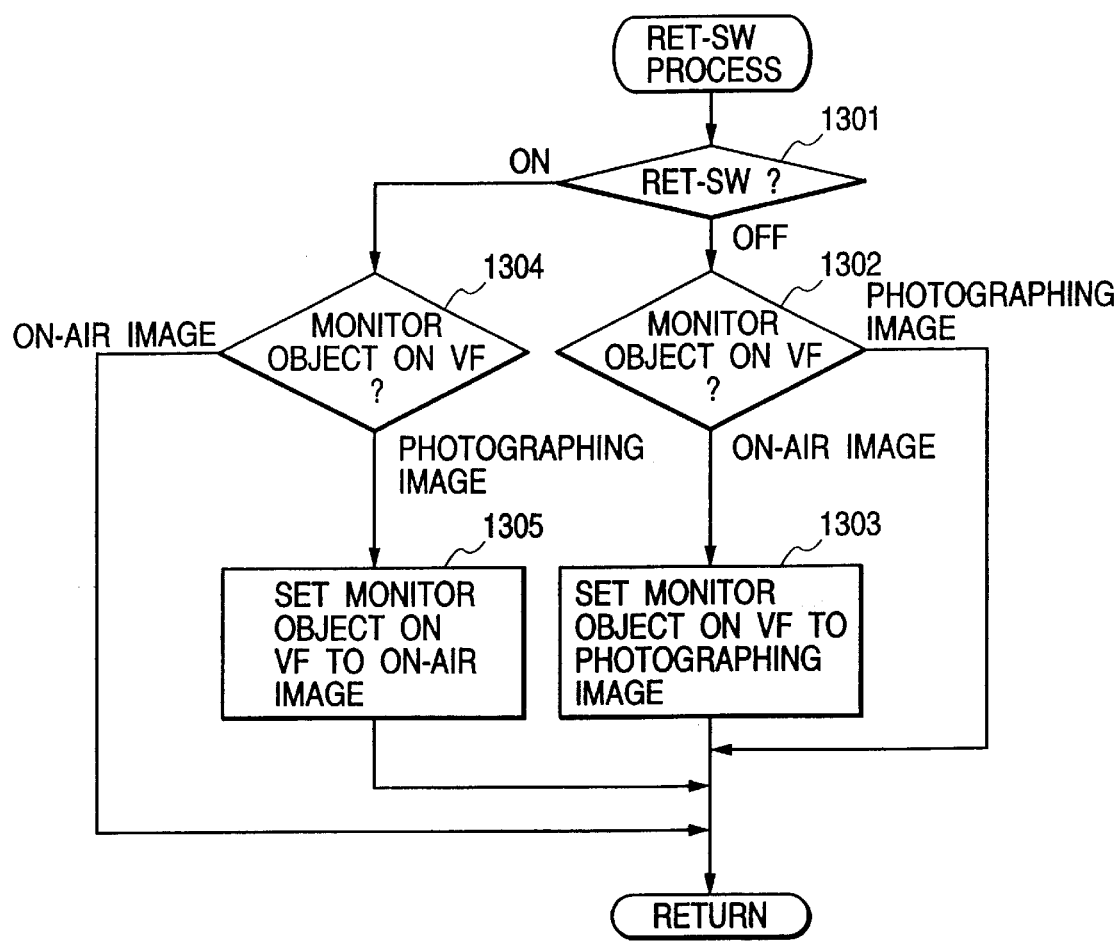
FIG. 13 is a flowchart of RET-SW process.

The sub-routine "RET-SW process" will next be described with reference to FIG. 13.

First, a state of RET-SW is checked at step 1301. When it is judged to be ON state, the processing goes to step 1304. Moreover, when it is judged to be OFF state at step 1301, the processing goes to step 1302.

At step 1304, a monitor object on VF is checked.

When it is judged to be an on-air image, the sub-routine "RET-SW process" is completed. Moreover, when it is judged at step 1304 that the monitor object on VF is a photographing image, the processing goes to step 1305 to set the monitor object on VF to on-air image. The sub-routine "RET-SW process" is then completed. At step 1302, the monitor object on VF is checked. When it is judged to be the photographing image, the sub-routine "RET-SW process" is completed. When it is judged at step 1302 that the monitor object on VF is on-air image, the monitor object on VF is set to the photographing image at step 1303. The sub-routine "RET-SW process" is then completed.

Here, as shown in FIG. 1, since SW information is connected to the camera side 121 from the lens side 101 separate from the serial communication 141, the bCPU 122 of camera side 121 can read the SW information at any time independent of the information transfer of serial communication 141. Moreover, the SW information can be arranged in parallel on the connector for serial communication, or transferred to the camera side 121 using a connector separate from the serial communication.

Figure 14:
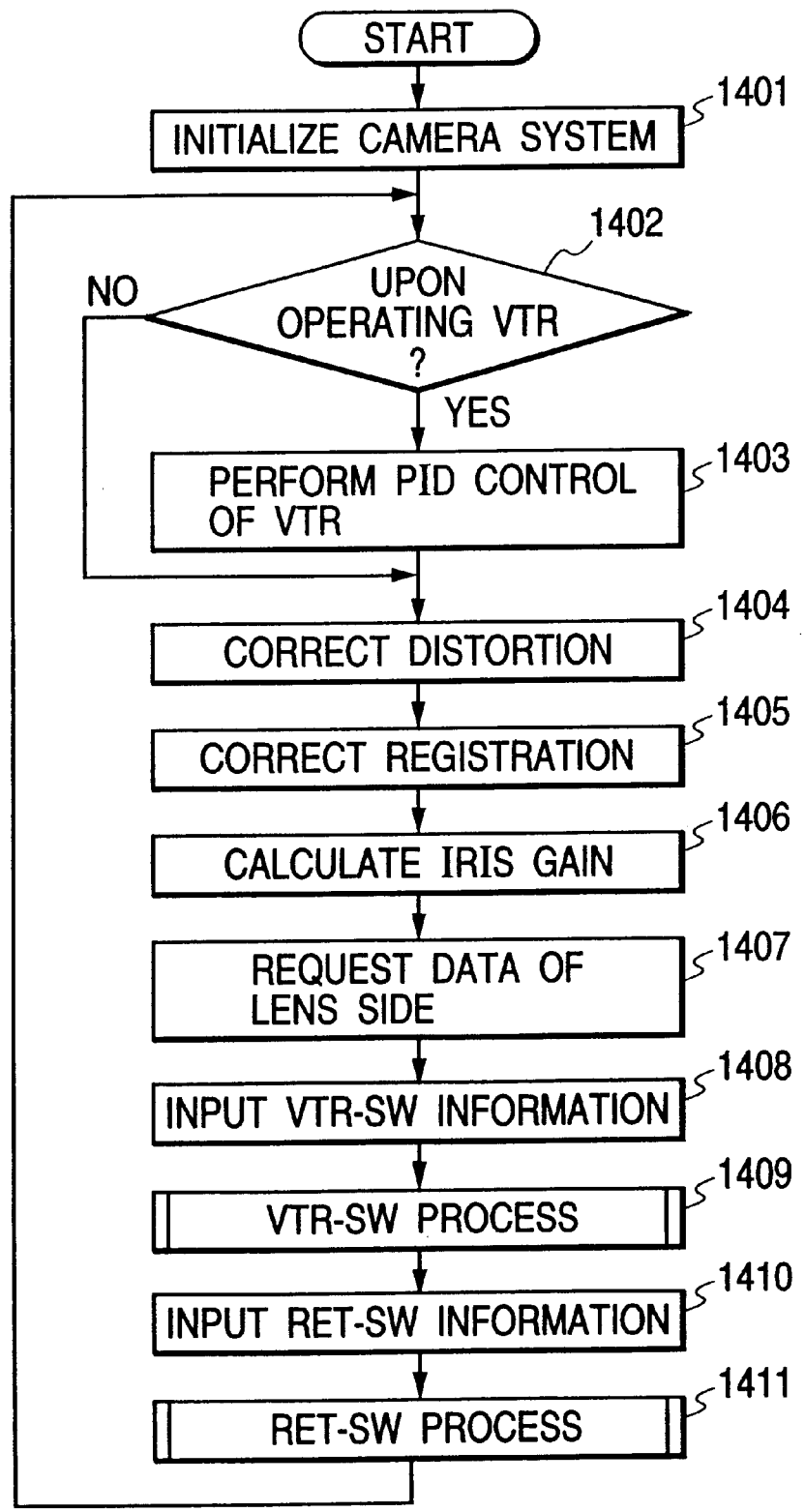
FIG. 14 is a flowchart of a main processing in the camera.

Moreover, in the embodiment, the switches 151 and 152 are connected to the camera computer independent of the serial communication line, but when only the serial communication of information is performed by operating the switches 151, 152, no line needs to be provided, and the processing of steps 1408 to 1411 of FIG. 14 is also unnecessary. Furthermore, in the embodiment, communications are performed at the time of switch operations in steps 1408 to 1411 of FIG. 14 and steps 904 to 910 of FIG. 9, but only either one communication may be performed.

In the above, RET-SW and VTR-SW information have been illustrated as the high-speed transfer information, but the present invention can easily be applied to other SW information.

Moreover, the present invention can also be applied to data requiring high-speed transfer other than SW data, e.g., strobe light emitting timing, single-lens reflex camera diaphragm information, focus lens position information in AF system, and the like.

Furthermore, the communication between lens and camera has been described, but the present invention can be applied, for example, to a communication between universal head and lens or between cameras.

Figure 15:
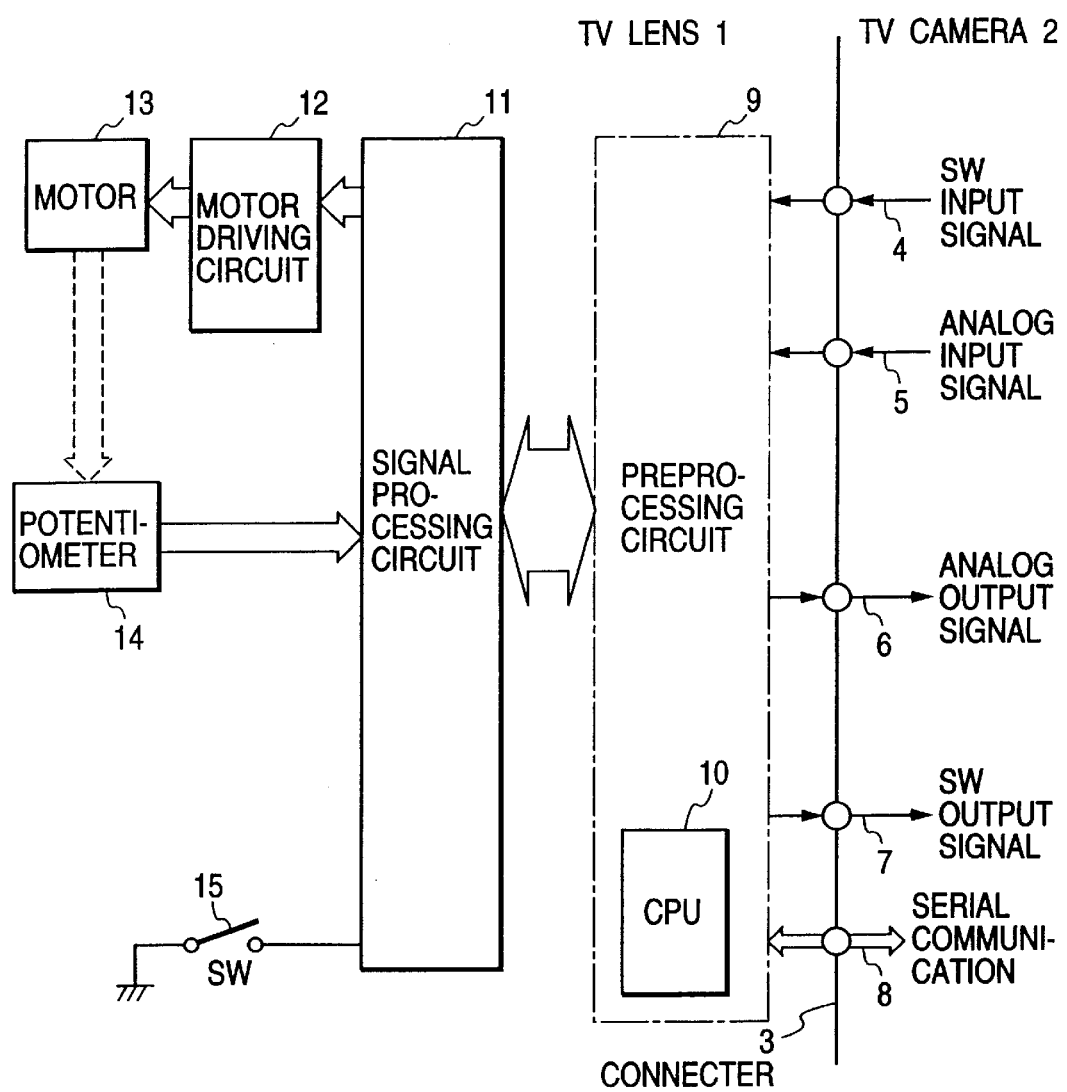
FIG. 15 is a block diagram of another embodiment of the present invention.

FIG. 15 is a block diagram of TV camera and TV lens according to another embodiment of the present invention. Electric connection between TV lens 1 and TV camera 2 is indicated in a lens-camera interface by a connector 3. When the electric interface is viewed from TV camera 2, a SW input signal 4 from a switch (not shown) in TV camera 2 and an analog input signal 5 generated by TV camera 2 are transmitted to TV lens 1. The TV lens 1 transmits an analog output signal 6 and a SW output signal 7 to TV camera 2. Additionally, a new serial communication 8 (digital communication) is connected between TV lens 1 and TV camera 2.

An inside of TV lens 1 will be described. Each signal of the lens-camera interface is received by a preprocessing circuit 9 for electrically processing the signal for a signal processing circuit 11 in the lens. The serial (digital) communication 8 is connected to CPU 10 having a transmission/reception function. For an operation of TV lens 1, the SW input signal 4 and analog input signal 5 from TV camera 2 are transmitted to the signal processing circuit 11 via the preprocessing circuit 9 of TV lens 1 to operate each function of TV lens, e.g., iris, zoom, focus, extender and the like.

Each function motor 13 is operated by the signal processing circuit 11 via a motor driving circuit 12. Information indicating each function state of TV lens 1 is obtained from a potentiometer 14 operatively connected to the motor 13, and transmitted as the analog output signal 6 to TV camera 2 via the signal processing circuit 11 and preprocessing circuit 9.

Similarly, information of SW 15 in TV lens 1 is also transmitted as the SW output signal 7 to TV camera 2 via the signal processing circuit 11 and preprocessing circuit 9. Formats of information passed through the serial (digital) communication 8 are the same as those of the aforementioned SW input signal 4, analog input signal 5, analog output signal 6 and SW output signal 7.

Specific constitutions of the preprocessing circuit 9 and CPU 10 of TV lens 1 of FIG. 15 will be described with reference to FIGS. 16 to 26.

FIGS. 16 to 20 show processings of the SW input signal and analog input signal to TV lens 1 from TV camera 2.

Figure 16:
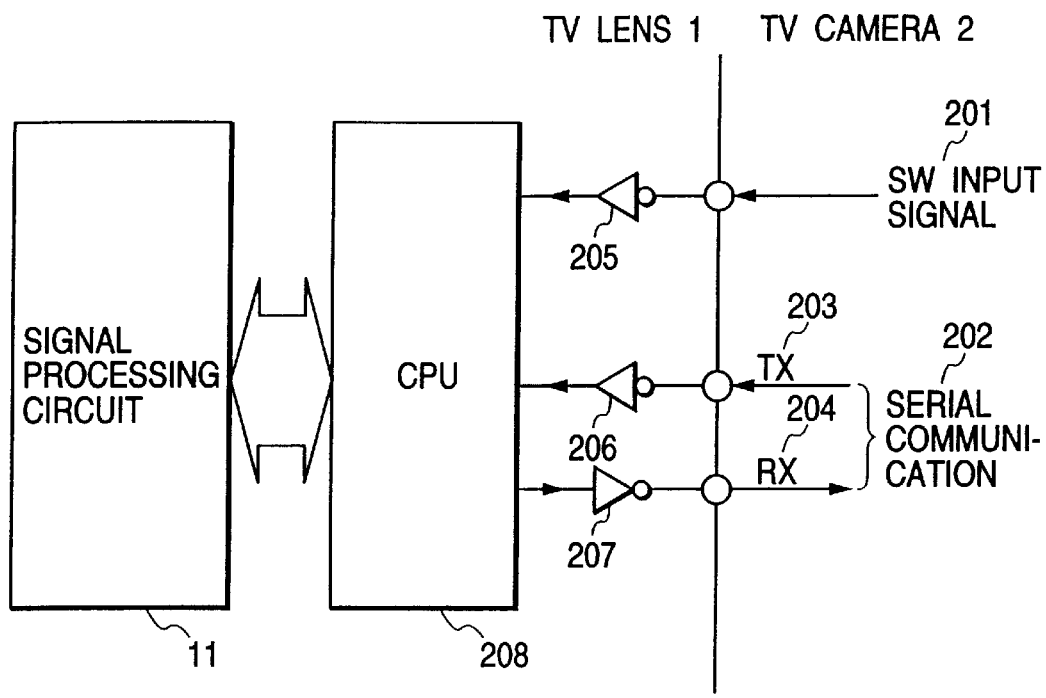
FIGS. 16, 17, 18, 19, 20, 21, 22, 23, 24, 25, 26, 27, 28, 29, 30, 31, 32 and 33 are block diagrams showing specific examples of FIG. 15, respectively.

FIG. 16 shows an example in which a SW input signal 201 and a transmission signal TX 203 of serial (digital) communication 202 are transmitted to TV lens 1. The SW input signal 201 is taken into CPU 208 via a buffer 205 in TV lens 1. The TX signal 203 of serial (digital) communication 202 is also connected to CPU 208 via a buffer 206 in TV lens 1, and transmitted to the signal processing circuit 11.

Figure 17:
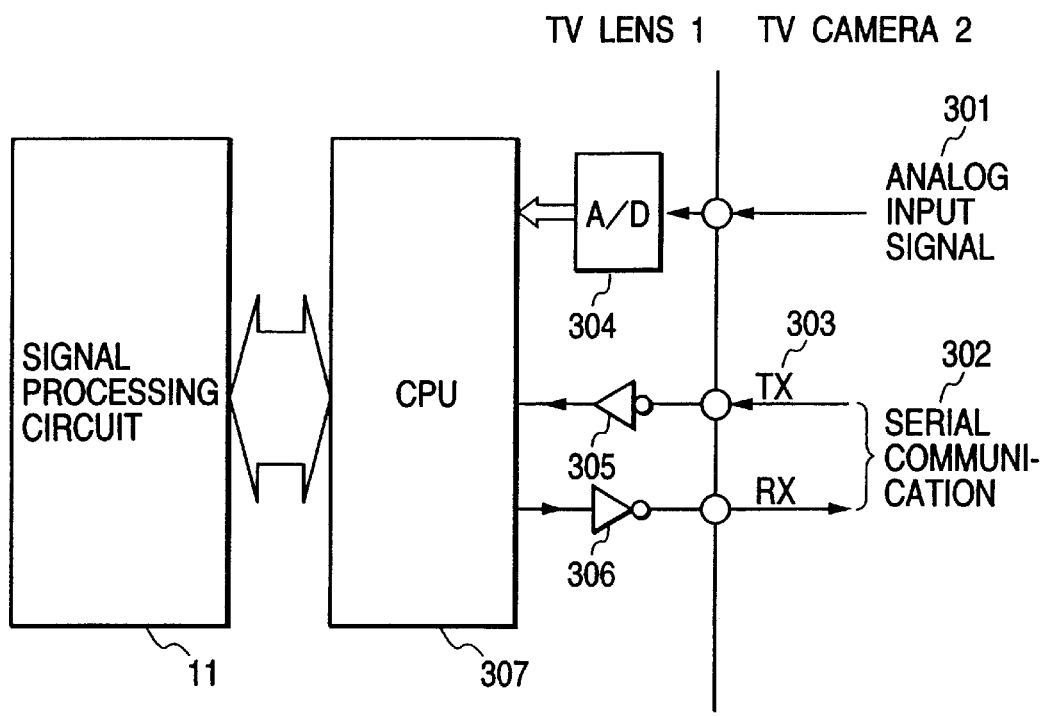

FIG. 17 shows an example in which an analog input signal 301 and a transmission signal TX 303 of serial (digital) communication 302 are transmitted to TV lens 1. The analog input signal 301 is taken into CPU 307 via an A/D converter 304 in TV lens 1. The TX signal 303 of serial (digital) communication 302 is also connected to CPU 307 via a buffer 305 in TV lens 1, and transmitted to the signal protessing circuit 11.

Figure 18:
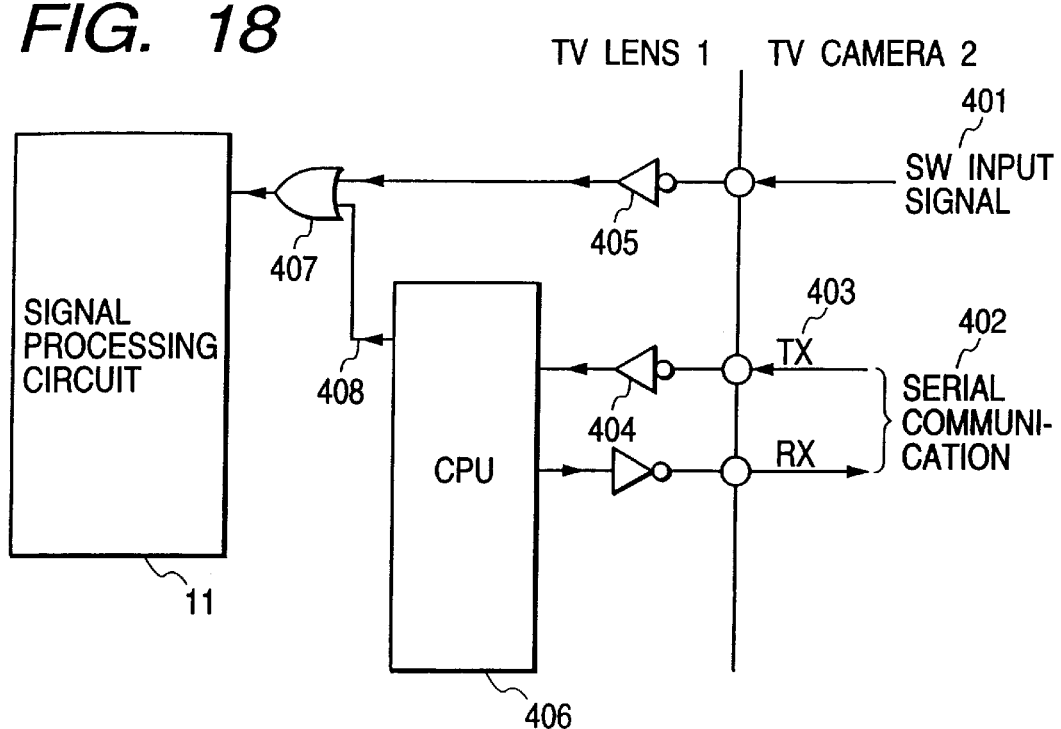

FIG. 18 shows an example in which a SW input signal 401 and a transmission signal TX 403 of serial (digital) communication 402 are transmitted to TV lens 1. The SW input signal 401 is transmitted to OR gate 407 via a buffer 405 in TV lens 1.

The TX signal 403 of serial (digital) communication 402 is connected to CPU 406 via a buffer 404 in TV lens 1. The TX signal 403 is decoded in CPU 406, and the same signal 408 as the SW input signal 401 is transmitted to the OR gate 407 from CPU 406. An output of OR gate 407 is then transmitted to the signal processing circuit 11.

Figure 19:
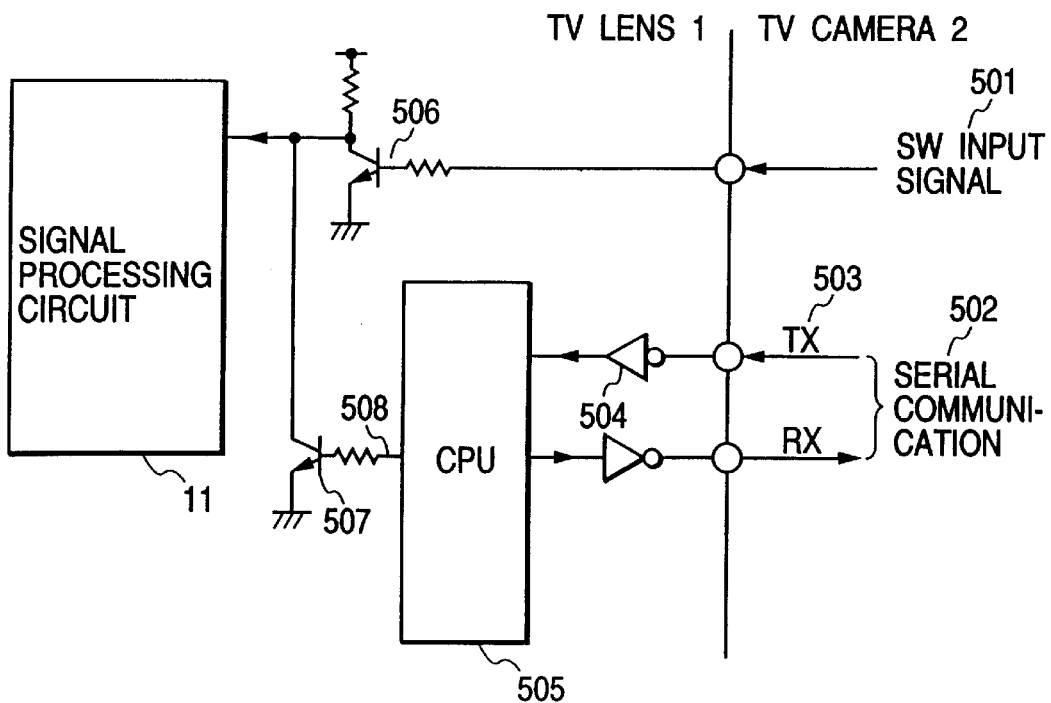

FIG. 19 shows an example in which a SW input signal 501 and a transmission signal TX 503 of serial (digital) communication 502 are transmitted to TV lens 1. The SW input signal 501 is transmitted to a base of transistor 506 in TV lens 1. The TX signal 503 of serial (digital) communication 502 is connected to CPU 505 via a buffer 504 in TV lens 1. The TX signal 503 is decoded in CPU 505, and the same signal 508 as the SW input signal 501 is transmitted to a base of transistor 507 from CPU 505. Collectors of the transistors 506 and 507 are connected to form a wired OR, and the line is transmitted to the signal processing circuit 11.

Figure 20:
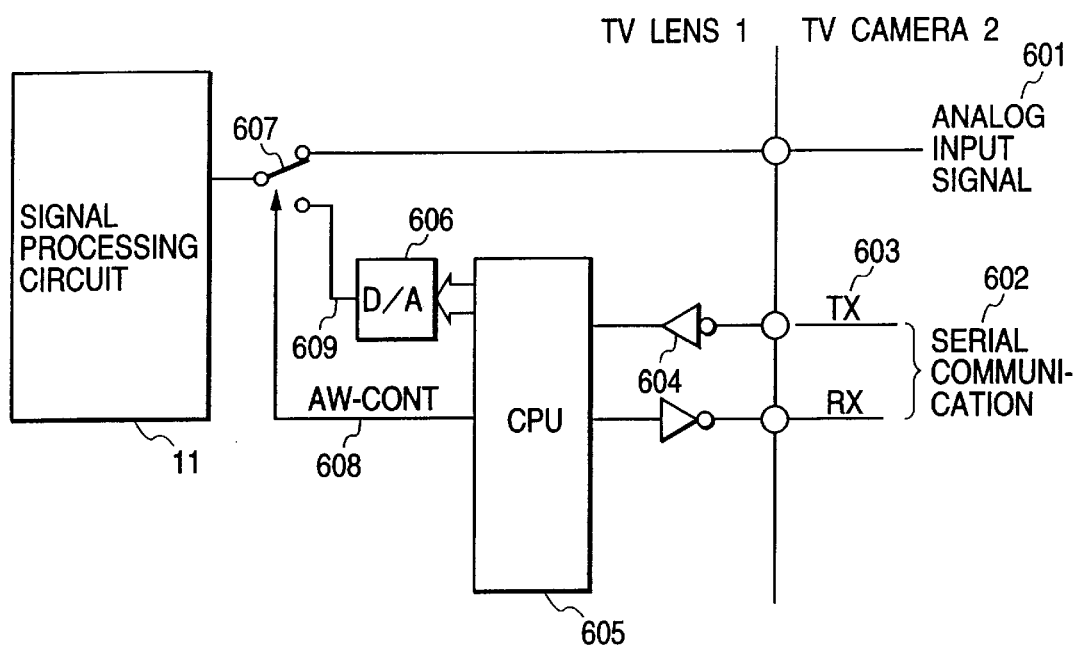

FIG. 20 shows an example in which an analog input signal 601 and a transmission signal TX 603 of serial (digital) communication 602 are transmitted to TV lens 1. The analog input signal 601 is connected to one end of an analog SW 607 in TV lens 1.

The TX signal 603 of serial (digital) communication 602 is connected to CPU 605 via a buffer 604 in TV lens 1. The TX signal 603 is decoded in CPU 605, to obtain the same analog signal 609 as the analog input signal 601, a digital signal corresponding to the analog signal 609 is transmitted to a D/A converter 606, and the analog signal 609 as a D/A converter output is connected to the other end of the analog SW 607.

The CPU 605 selects which of the analog signals 601 and 609 input to the analog SW 607 is to be transmitted to the signal processing circuit 11. The CPU 605 judges whether the connection of TV lens 1 and TV camera 2 is a conventional parallel signal or a serial (digital) communication, to switch the analog SW 607 to the analog signal 609 by a switch signal 608 from CPU 605 in case of the serial (digital) communication or otherwise switch to the analog input signal 601.

Figure 21:
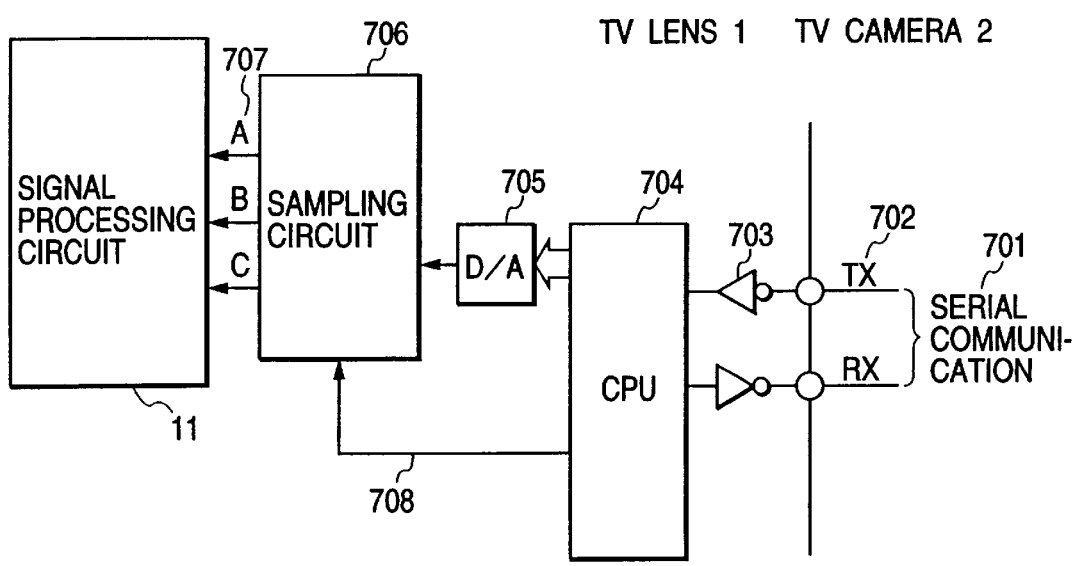

FIG. 21 shows a processing in TV lens when a plurality of analog input signals are transmitted to TV lens 1 from TV camera 2 via a serial (digital) communication 701.

A TX signal 702 of serial (digital) communication 701 is transmitted to CPU 704 via a buffer 703 in TV lens 1.

When three types of analog signals are handled herein, digital data is transmitted to D/A converter 705 from CPU 704 to output three types of analog signals. The D/A converter 705 transmits to a sampling circuit 706 three types (A, B, C) of analog signals 709 consecutive in time series. Subsequently, when a sampling signal 708 is transmitted to the sampling circuit 706 from CPU 704, sampling signals 707 for the three types of analog signals 709 are transmitted to the sampling circuit 706 from CPU 704 in such a manner that three types of analog signals 707 can be outputted from the sampling circuit 706. A plurality (A, B, C) of analog signals 707 obtained from the sampling circuit 706 are transmitted to the signal processing circuit 11.

In FIGS. 22 to 26, a signal of a switch in TV lens 1 and an analog signal generated in TV lens are converted to a SW output signal to be transmitted to TV camera 2, analog output signal and serial (digital) communication.

Figure 22:
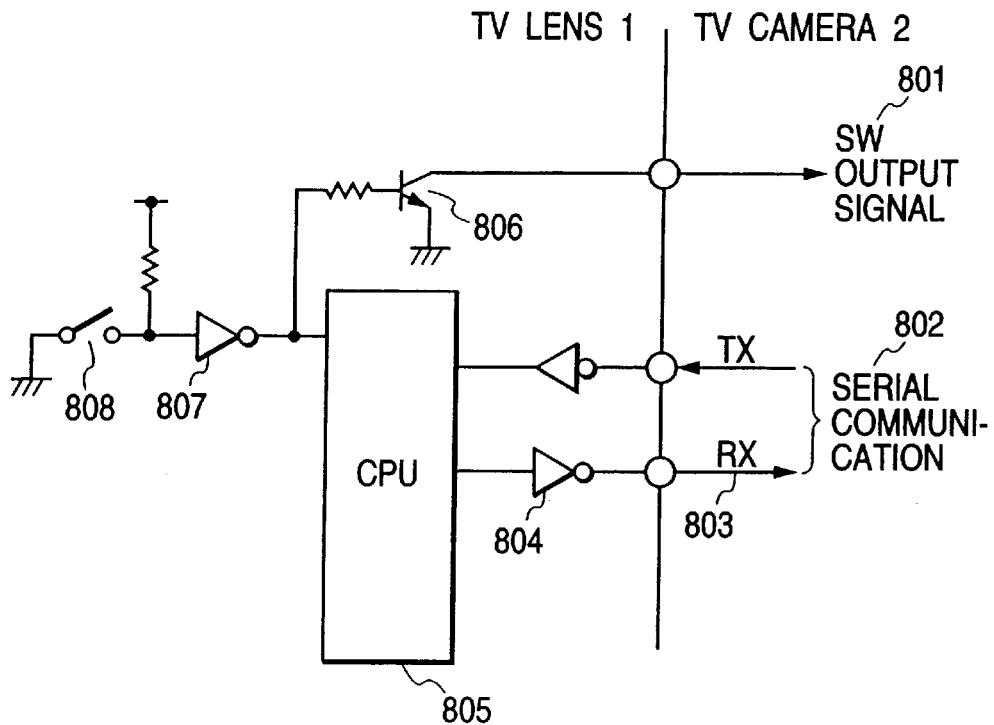

In FIG. 22 a signal of switch 808 in TV lens 1 is converted to a SW output signal 801 and RX signal 803 of serial (digital) communication 802.

The SW 808 is connected to a base of transistor 806 and a CPU 805 via a buffer 807. A collector line of transistor 806 is connected to the TV camera 2 as the SW output signal 801. The SW signal transmitted to CPU 805 via the buffer 807 is arithmetically processed inside the CPU 805, and transmitted as RX signal 803 of serial (digital) communication 802 via a buffer 804.

Figure 23:
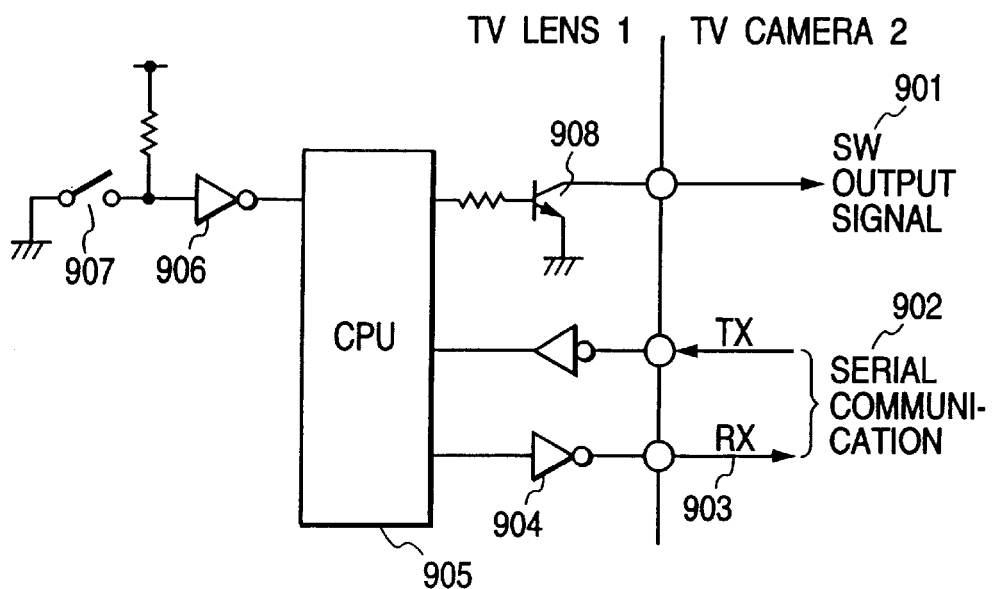

In FIG. 23 a signal of a switch 907 in TV lens 1 is converted to a SW output signal 901 and RX signal 903 of serial (digital) communication 902.

The SW 907 is connected to CPU 905 via a buffer 906. The SW signal of SW 907 transmitted to CPU 905 is arithmetically processed inside the CPU 905, and transmitted to a base of transistor 908 and a buffer 904. A collector of transistor 908 is transmitted as the SW output signal 901 to the TV camera 2.

An output of buffer 904 is output as the RX signal 903 of serial (digital) communication 902.

Figure 24:
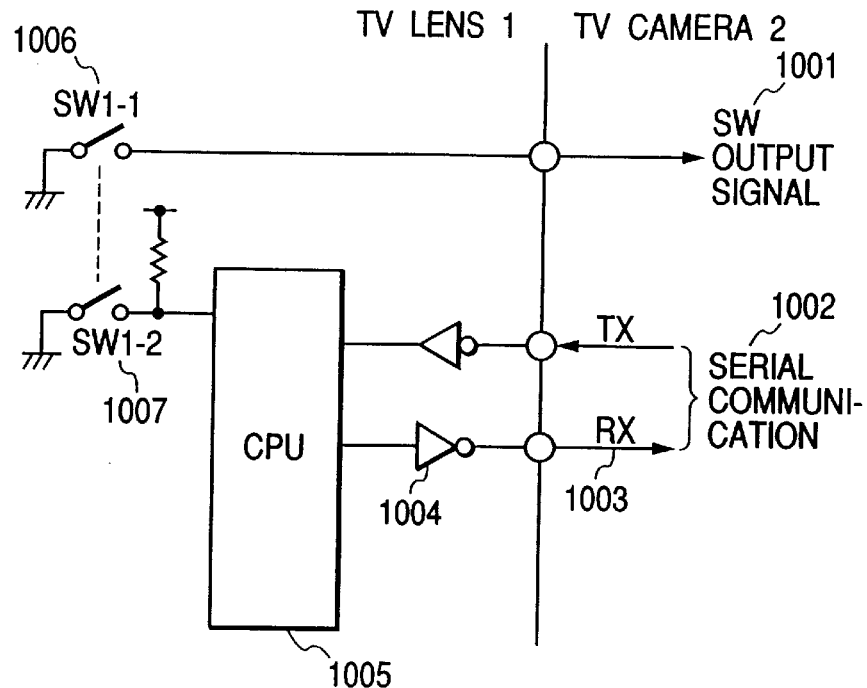

In FIG. 24 two switches 1006, 1007 are operatively connected. One switch 1006 directly outputs a SW output signal 1001, while the other switch 1007 transmits a signal to CPU 1005. The signal is arithmetically processed inside CPU 1005, and output as RX signal 1003 of serial (digital) communication 1002 via a buffer 1004.

Figure 25:
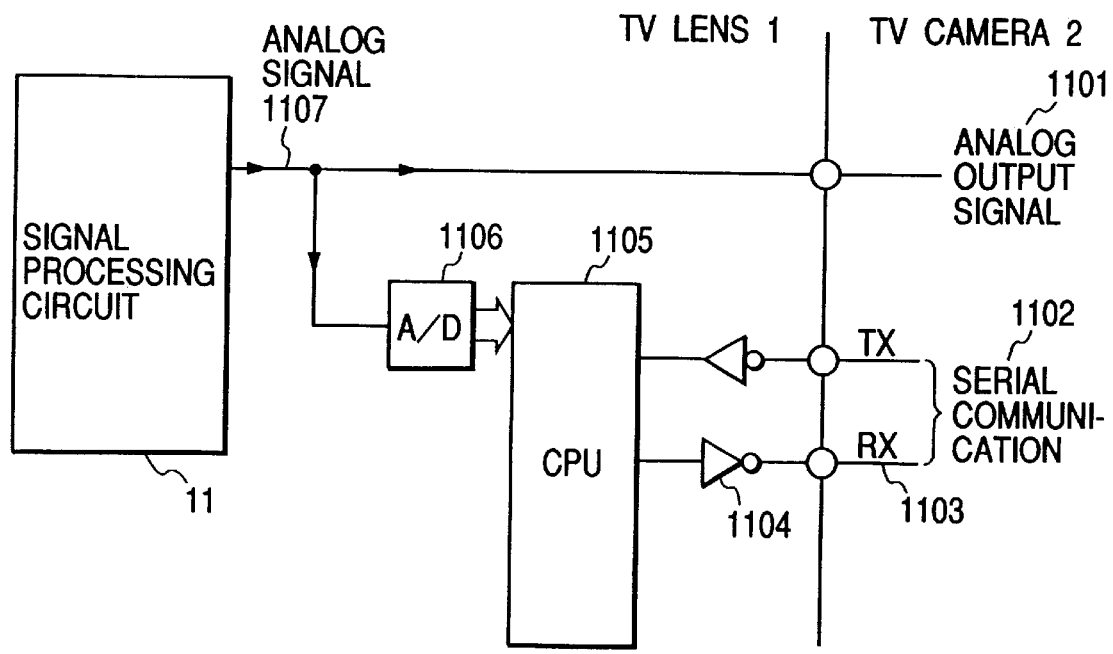

In FIG. 25 an analog signal 1107 from the signal processing circuit 11 is directly output as an analog output signal 1101, while the analog signal 1107 is transmitted as digital data to CPU 1105 via an A/D converter 1106.

The data is arithmetically processed inside the CPU 1105, and output as an RX signal 1103 of a serial (digital) communication 1102 via a buffer 1104.

Figure 26:
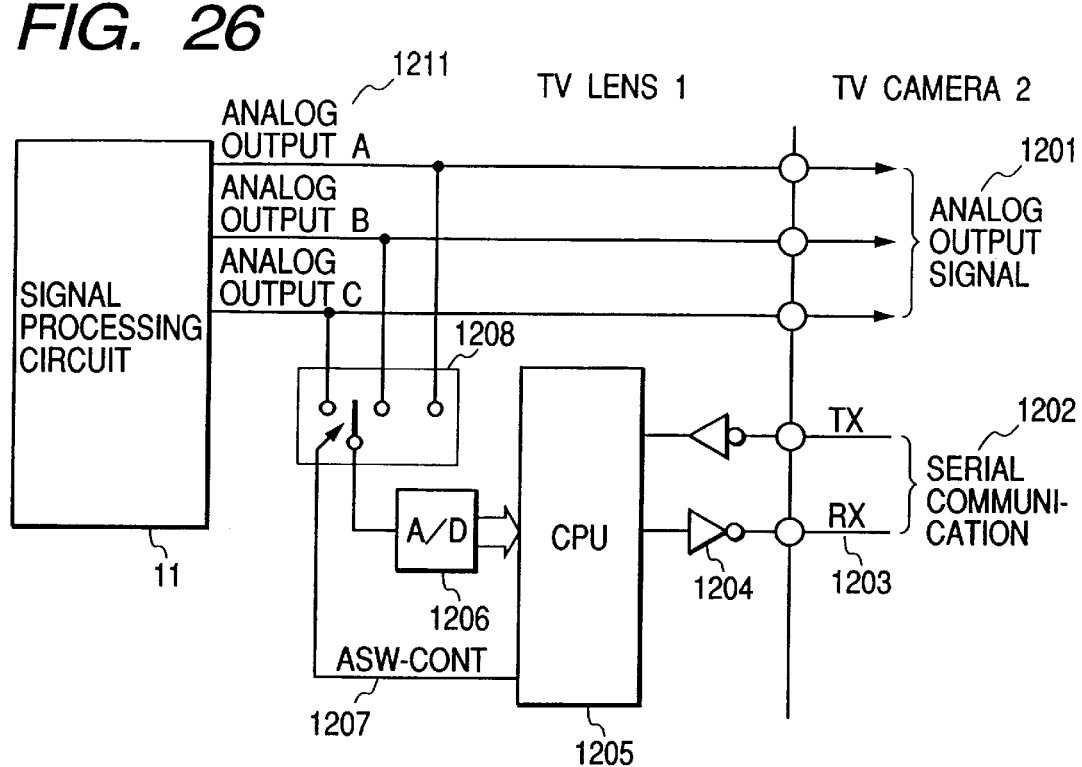

In FIG. 26 a plurality (A, B, C) of analog signals 1211 from the signal processing circuit 11 are directly output as analog output signals 1201, while the plurality of analog signals 1211 are sampled in time series by an analog SW 1208, and transmitted to an A/D converter 1206. A digital output of A/D converter 1206 is transmitted to CPU 1205. In order to sample the analog signals 1211 by the analog SW 1208, a signal 1207 for selecting the analog signal is transmitted to the analog SW 1208 from the CPU 1205.

The data from the A/D converter 1206 is arithmetically processed inside the CPU 1205, and outputted as an RX signal 1203 of a serial (digital) communication 1202 via a buffer 1204.

FIGS. 27 to 32 show embodiments in which a conventional signal and a serial (digital) communication signal are switched for use by one connector pin between TV lens 1 and TV camera 2.

Figure 27:
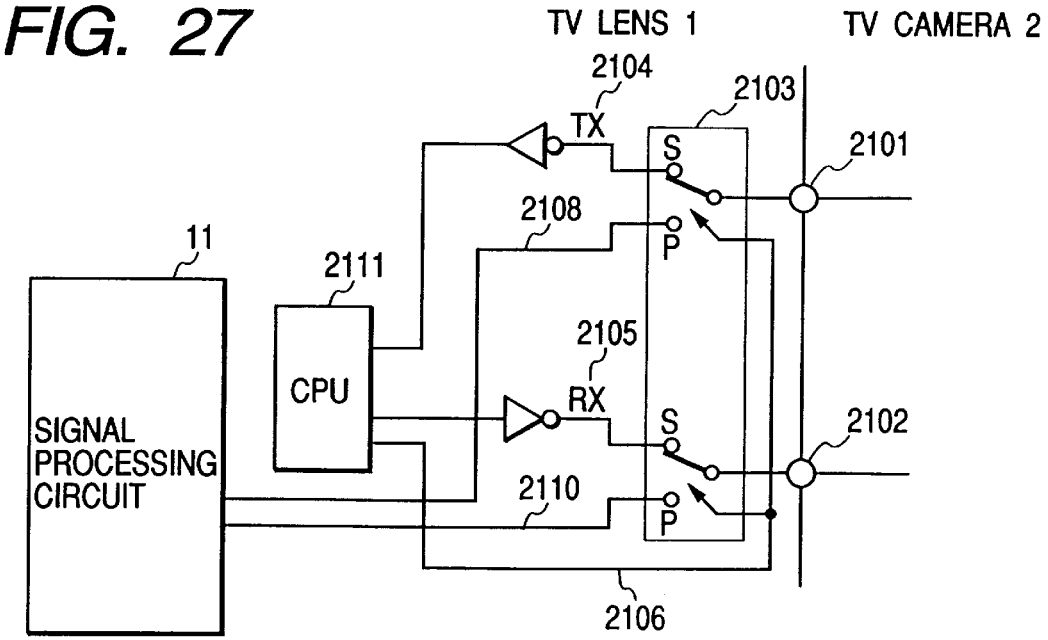

FIG. 27 shows an example using IC analog SW 2103.

A connector pin 2101 uses both a conventional signal 2108 and a serial (digital) communication TX signal 2104. The analog SW 2103 is switched by a signal 2106 from a CPU 2111.

A connector pin 2102 uses both a conventional signal 2110 and a serial (digital) communication RX signal 2105. The analog SW 2103 is switched by the signal 2106 in the same manner as for the TX signal 2104 and conventional signal 2108. Additionally, the conventional signals 2108, 2110 may be switch, analog, output, or input signals.

In the system, when TV lens 1 and TV camera 2 are electrically coupled, and a power supply is turned on in TV lens 1, the analog SW 2103 is switched to a serial (digital) communication side S by the switch signal 2106. When the TV camera 2 can perform serial (digital) communication, the communication is performed. When the TV camera cannot perform the serial (digital) communication, the analog SW 2103 is switched to a conventional signal line side P by the switch signal 2106.

When a TV lens-camera interface is used on the conventional signal line side, the TV lens-camera interface cannot be used by the serial (digital) communication until the power supply of TV lens is once turned off.

In FIG. 27, the connector pin 2101 is connected only to the serial (digital) communication TX signal without the analog switch, and the TV lens is connected via the TV lens-camera interface on the conventional signal line side. Even in this case, when the TX signal from TV camera is detected, switching to the serial (digital) communication interface can be realized.

Figure 30:
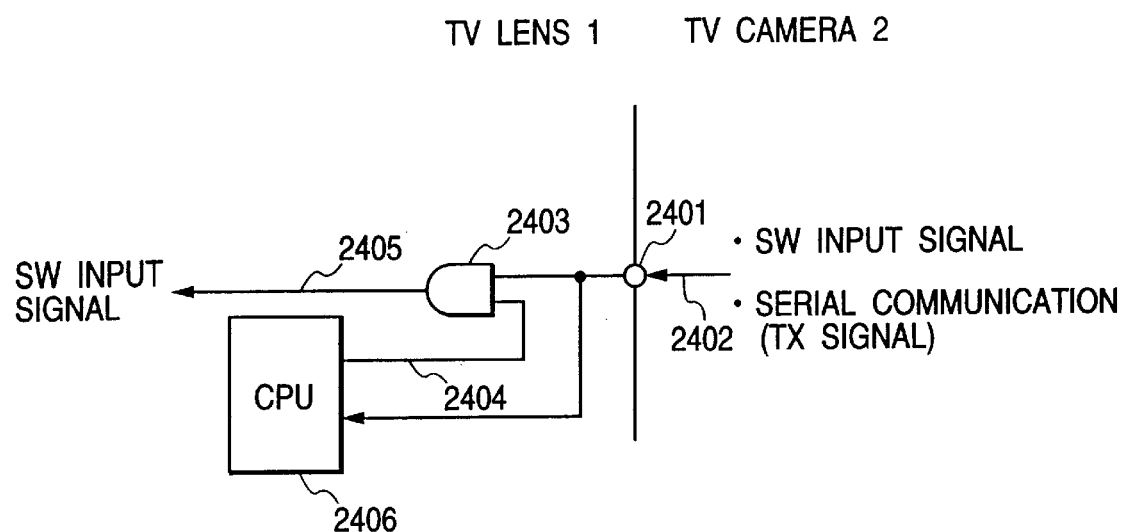
Figure 31:
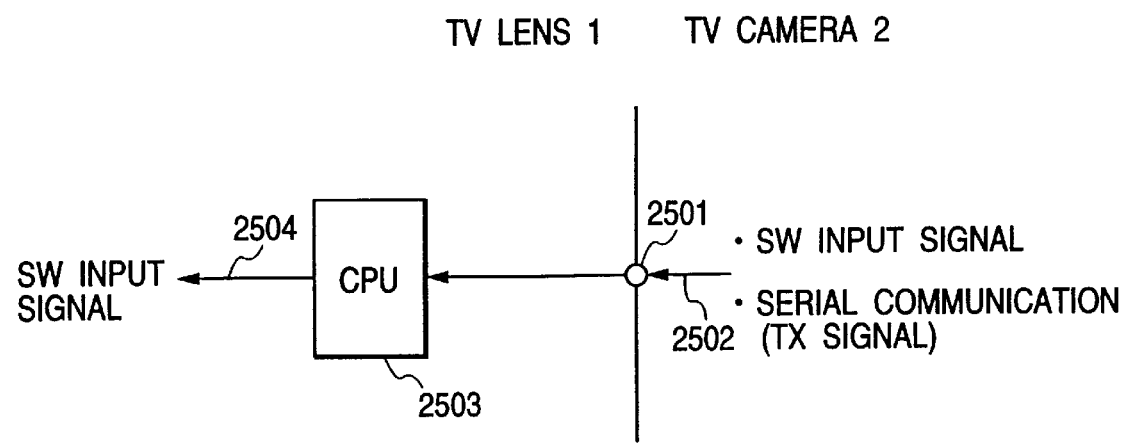
Figure 33:
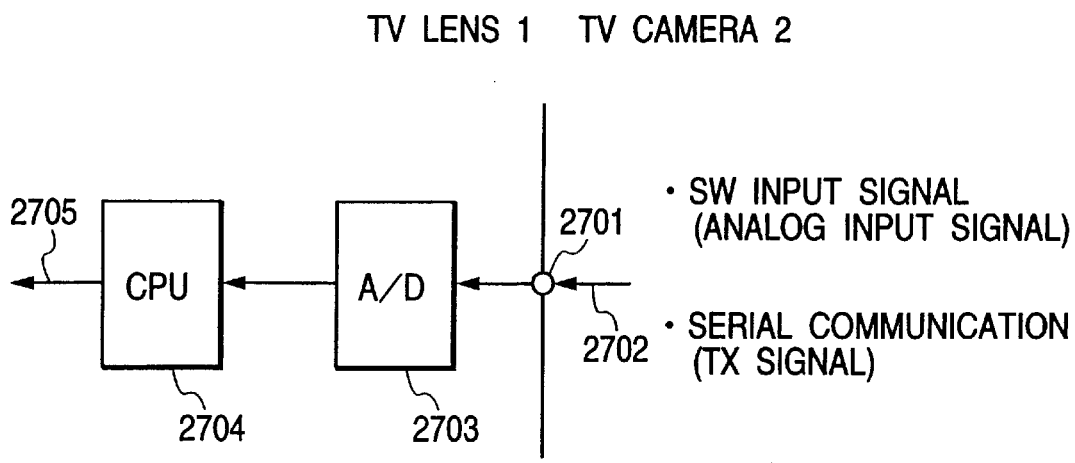

The same applies to FIGS. 30, 31, 33.

In the TV camera-lens interface, when one connector pin is used for different signals, there arises a problem that the signal switching fails, both TV lens and TV camera emit outputs, and electronic components are collapsed. To avoid this problem, the analog switch as shown in FIG. 27 is an effective measure.

Figure 28:
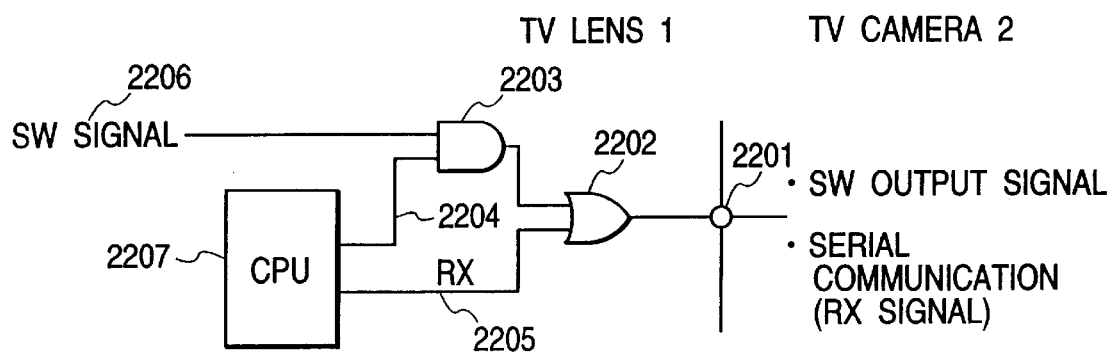

FIG. 28 shows a case where a connector pin 2201 uses both an RX signal of serial (digital) communication and a conventional SW output signal 2206.

When the conventional SW output signal 2206 is transmitted to the connector pin 2201, in a CPU 2207 a signal 2204 of CPU 2207 transmitted to AND gate 2203 is set to "1", and an RX line from the CPU 2207 to be transmitted to an OR gate 2202 is set to "0".

When an RX signal of serial (digital) communication is transmitted to the connector pin 2201, the signal 2204 from CPU is set to "0", and the RX signal of serial (digital) communication is transmitted to a signal line 2205 from the CPU 2207.

Additionally, a wired OR using a transistor collector can be used instead of the OR gate 2202.

Figure 29:
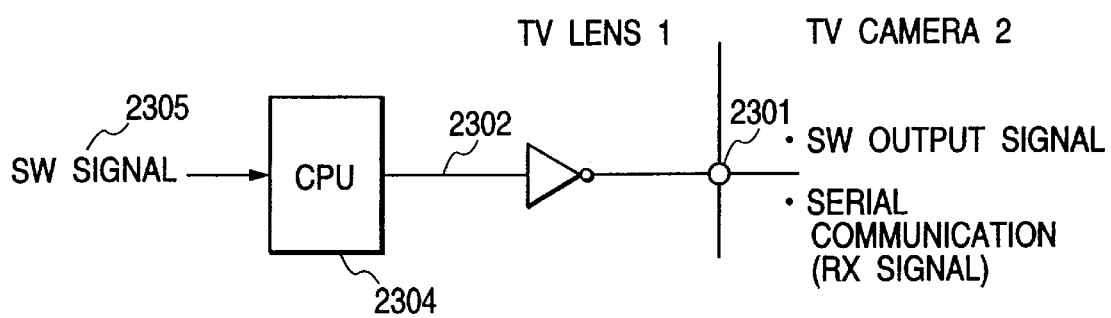

FIG. 29 shows a case where a connector pin 2301 uses both an RX signal of serial (digital) communication and a conventional SW output signal. When a conventional SW signal 2305 is transmitted to the connector pin 2301, the SW signal 2305 transmitted to the CPU 2304 is transmitted to a signal line 2302 from the CPU 2304 as it is.

When the RX signal of serial (digital) communication is transmitted to the connector pin 2301, the RX signal is outputted via the signal line 2302.

FIG. 30 shows a case where both a conventional SW input signal and a TX signal of serial (digital) communication are used in a connector pin 2401. A signal line 2402 used in the combined manner is connected to AND gate 2403 and CPU 2406.

When the conventional switch input signal is used, a signal 2404 transmitted to the AND gate 2403 from the CPU 2406 is set to "1", and the switch input signal is outputted via a signal line 2405. In this case, the SW input signal transmitted to the CPU 2406 is ignored by the CPU 2406.

When the TX signal of serial (digital) communication is used, the signal 2404 is set to "0", and an output of the signal line 2405 is set to "0". The TX signal is transmitted to the CPU 2406 via the signal line 2402.

FIG. 31 shows a case where a conventional switch input signal and a TX signal of serial (digital) communication are both used in a connector pin 2501. A signal line 2502 from TV camera 2 is connected to a CPU 2503.

In the TV lens 1, it is judged in the CPU 2503 that the conventional SW input signal or the TX signal of serial (digital) communication is to be selected. When a signal of signal line 2502 is treated as the conventional SW input signal, the SW input signal is outputted via a signal line 2504 from the CPU 2503.

Figure 32:
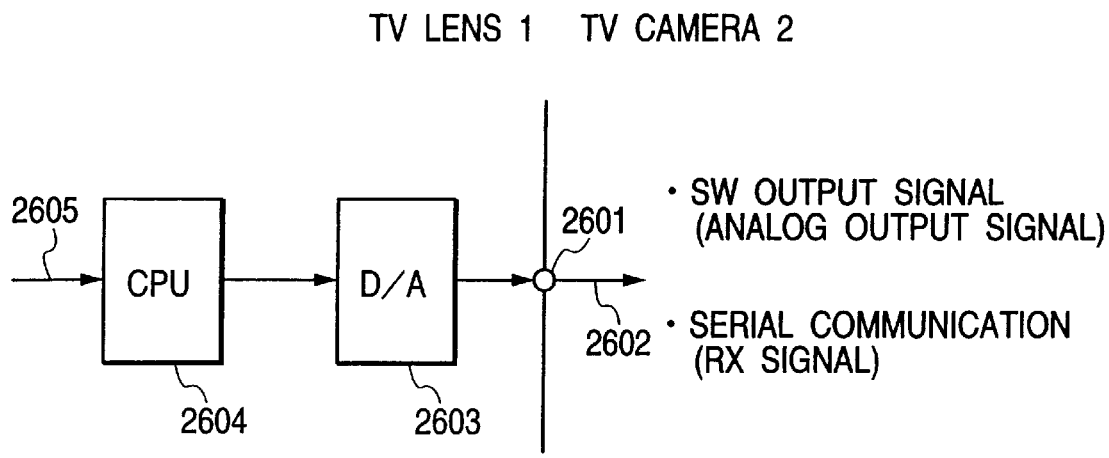

FIG. 32 shows a case where a conventional SW output signal or an analog output signal and an RX signal of serial (digital) communication are both used in a connector pin 2601.

The conventional SW output signal or a digital signal corresponding to the analog output signal is transmitted to CPU 2604 via a signal line 2605. The CPU 2604 transmits the conventional SW output signal or the analog output signal or digital data corresponding to the RX signal of serial (digital) communication to D/A converter 2603, and the D/A converter transmits the conventional SW output signal or the analog output signal and the RX signal of serial (digital) communication to the TV camera 2 via a signal line 2602.

FIG. 33 shows a case where a conventional SW input signal or an analog input signal and a TX signal of serial (digital) communication are both used in a connector pin 2701. A signal line 2702 from TV camera 2 is connected to A/D converter 2703 in TV lens 1. A digital signal outputted from A/D converter 2703 is transmitted to CPU 2704.

It is judged in CPU 2703 whether the conventional SW input signal, the analog input signal or the TX signal of serial (digital) communication is transmitted. When the signal of the signal line 2702 is treated as the conventional SW input signal or the analog input signal, CPU 2704 outputs the SW input signal or the analog input signal via a signal line 2705.

Figure 34:
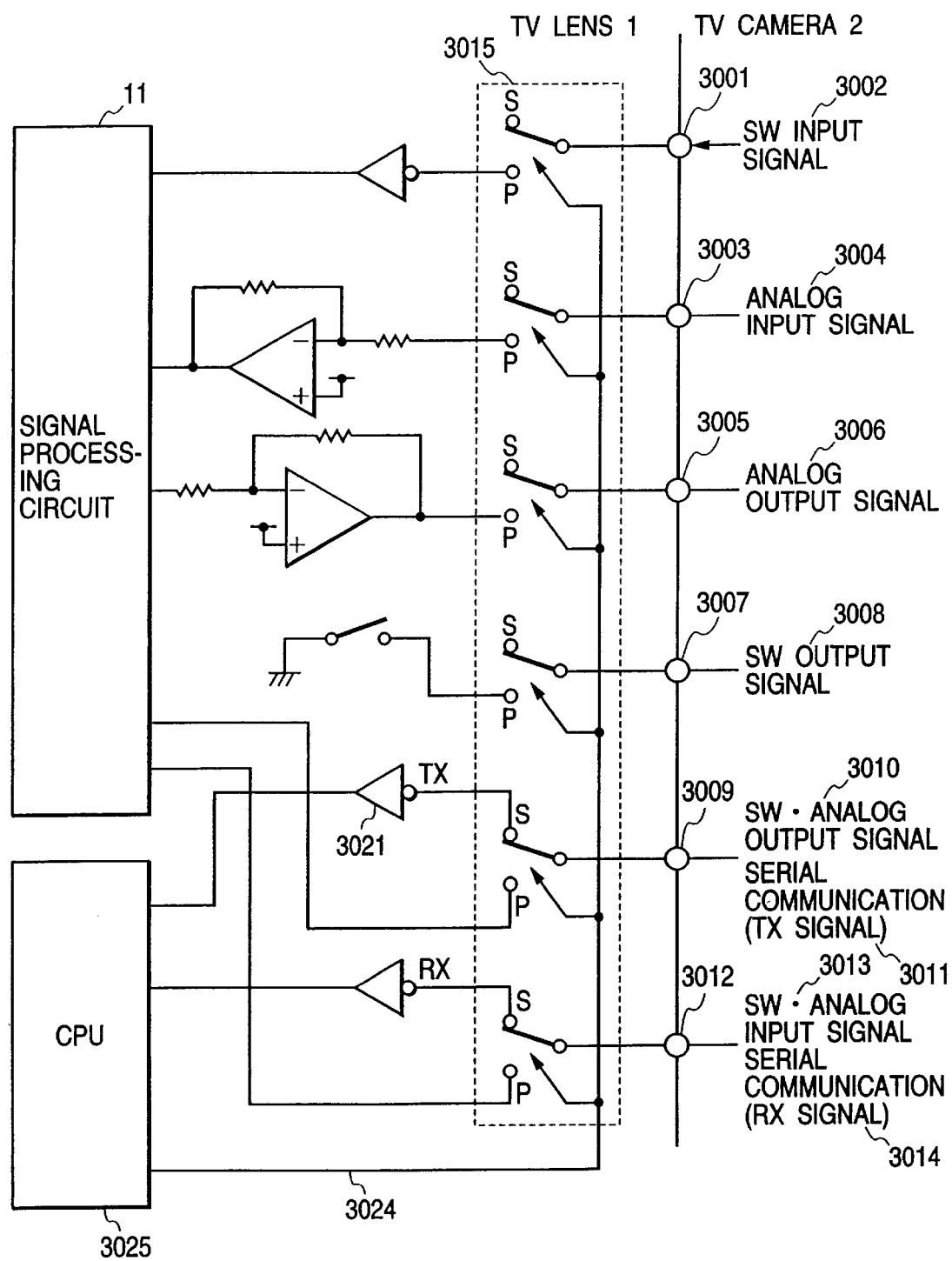
FIG. 34 is a block diagram showing further embodiment of the present invention.
Figure 35:
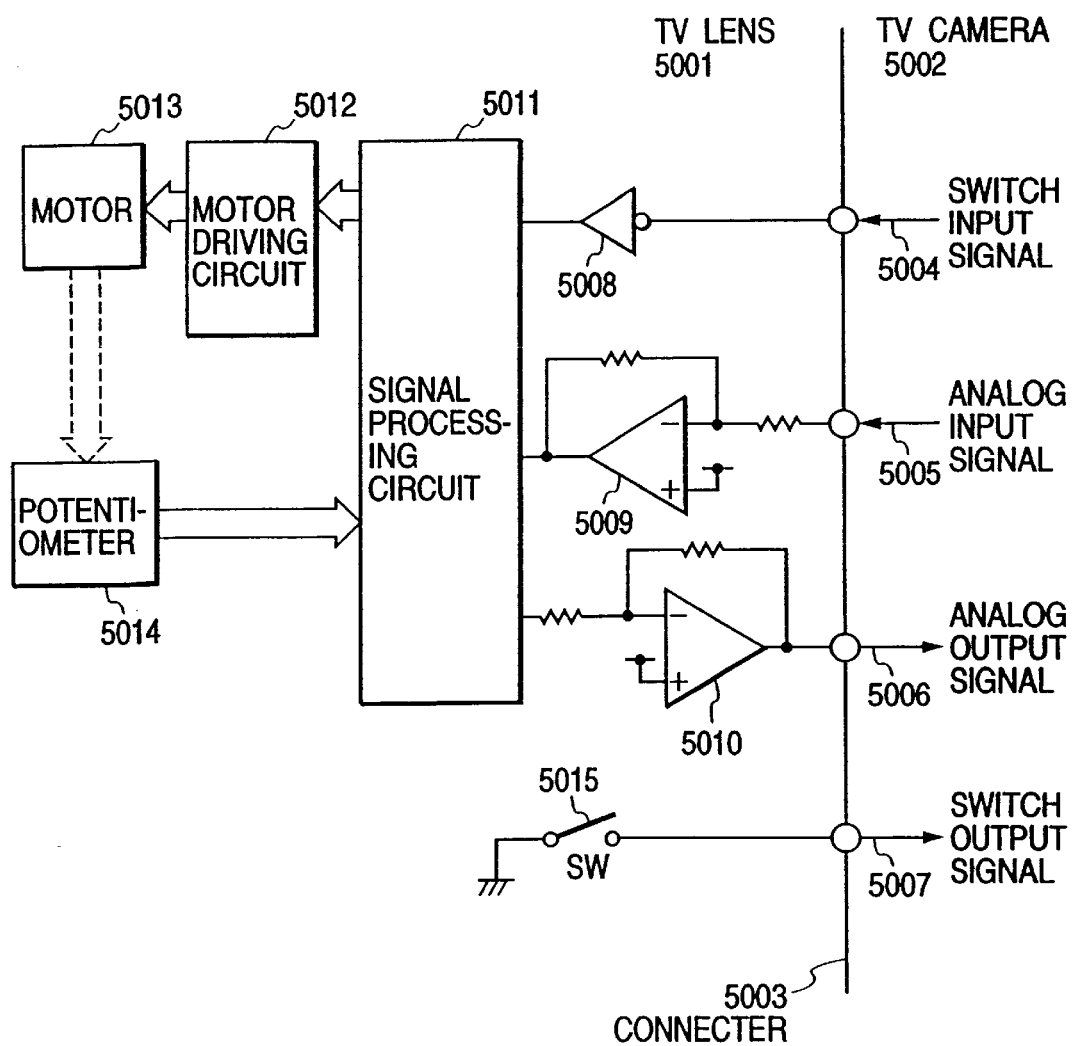
FIG. 35 is a block diagram of a conventional example.

FIG. 34 is a block diagram of TV camera and TV lens according to further embodiment of the present invention. In FIG. 34 a case using a conventional signal and a serial (digital) communication are completely switched by an analog SW.

A SW input signal 3002, analog input signal 3004, analog output signal 3006, and SW output signal 3008 of TV camera 2 connected to connector pins 3001, 3003, 3005, 3007; a SW/analog output signal 3010 of TV camera 2 or a TX signal 3011 of serial (digital) communication connected to a connector pin 3009; and a SW/analog input signal 3013 or an RX signal 3014 of serial (digital) communication of TV camera 2 connected to a connector pin 3012 are switched to conventional signals P or serial communications S by an analog switch 3015 in TV lens 1. A conventional signal/serial (digital) communication switch signal from CPU 3025 is switched to the conventional signal P or the serial communication S by a signal line 3024.

Moreover, the CPU is connected to a signal processing circuit via A/D converter and D/A converter to perform data communication with the analog signal processing circuit 11 via the CPU at the time of serial communication.

What is claimed is:

1. An image signal recording system in which a serial communication of a request command and information is performed between a first device and a second device electrically connected to the first device, and the information is serially transmitted to the first device from the second device based on the request command from the first device via a serial communication line, comprising:

a signal generating section provided on said second device for forming a signal indicating an operation state of an operation member provided on said second device independent of said request command; and a parallel communication line provided independent of said serial communication line, the signal from the signal generating section being transmitted to said first device from said second device via the parallel communication line, wherein a signal transmitting speed of the parallel communication line is higher than that of the serial communication line.

2. The recording system according to claim 1 wherein said signal generating section generates the signal indicating an operation state of an operation member provided on said second device.

3. The recording system according to claim 2 wherein said first device is a camera, and the second device is a lens device.

4. The recording system according to claim 3 wherein said camera comprises a recording device for recording a video signal, said signal is information for controlling an operation of the recording device, and said camera controls the operation of the recording device by the information.

5. The recording system according to claim 3 wherein said camera comprises monitor means for monitoring an image via the lens device, and said signal is information for controlling an image display state by the monitor means.

6. The recording system according to claim 5 wherein said monitor means comprises a function of displaying an image transmitted to the camera from an external device independent of the image via said lens device, and switching of the image by said monitor means is controlled by said information.

7. The recording system according to claim 3 wherein said signal is information for controlling a predetermined function of the camera, and an operation state of the predetermined function of said camera is controlled in response to the information.

8. The recording system according to claim 3 wherein a first line for transmitting the information to the lens device from the camera and a second line for transmitting the information to the camera from the lens device are provided between said camera and the lens device, a digital serial communication of the request command and the information is performed via the first line and the second line, said request command is transmitted to the lens device from the camera via the first line, and the information is transmitted to the camera from the lens device via the second line in response to the request command.

9. An image signal recording system in which a serial communication of a request command and information is performed between a first device and a second device electrically connected to the first device, and the information is serially transmitted to the first device from the second device based on the request command from the first device via a serial communication line, comprising:
  a signal generating section provided on said second device for forming a signal indicating an operation state of an operation member provided on said second device independent of said request command; and
  a control circuit for transmitting the signal from the signal generating section to said first device via said serial communication line regardless of the request command from said first device, wherein a signal indicating an operation state of an operating member is a serial signal.

10. The recording system according to claim 9 wherein said signal generating section generates said signal by an operation of an operation member provided on said second device.

11. The recording system according to claim 10 wherein said first device is a camera, and the second device is a lens device.

12. The recording system according to claim 11 wherein said camera comprises a recording device for recording a video signal, said predetermined information is information for controlling an operation of the recording device, and said camera controls the operation of the recording device by the information.

13. The recording system according to claim 11 wherein said camera comprises monitor means for monitoring an image via the lens device, and said predetermined information is information for controlling an image display state by the monitor means.

14. The recording system according to claim 13 wherein said monitor means comprises a function of displaying an image transmitted to the camera from an external device independent of the image via said lens device, and switching of the image by said monitor means is controlled by said predetermined information.

15. The recording system according to claim 11 wherein said predetermined information is information for controlling a predetermined function of the camera.

16. The recording system according to claim 11 wherein a first line for transmitting the information to the lens device from the camera and a second line for transmitting the information to the camera from the lens device are provided between said camera and the lens device, a digital serial communication of the request command and the information is performed via the first line and the second line, said request command is transmitted to the lens device from the camera via the first line, and the information is transmitted to the camera from the lens device via the second line in response to the request command.

17. The recording system according to claim 9 wherein a serial communication of said predetermined information by said signal is performed via the same communication line as for the serial communication of the information by said request command.

18. An optical device for use as a second device in an image signal recording system in which a serial communication of a request command and information is performed between a first device and the second device electrically connected to the first device, and the information is serially transmitted to the first device from the second device based on the request command from the first device via a serial communication line, comprising:
  a signal generating section for forming a signal indicating an operation state of an operation member provided on said second device independent of said request command; and
  a control circuit for transmitting a signal from the signal generating section to said first device via a communication terminal and a parallel communication line provided independent of said serial communication line, wherein a signal transmitting speed of the parallel communication line is higher than that of the serial communication line.

19. The optical device according to claim 18 wherein said signal generating section generates the signal indicating an operation state of an operation member provided on said second device.

20. The optical device according to claim 19 wherein said first device is a camera, and the second device is a lens device.

21. The optical device according to claim 20 wherein said camera comprises a recording device for recording a video signal, said signal is information for controlling an operation of the recording device, and said camera controls the operation of the recording device by the information.

22. The optical device according to claim 20 wherein said camera comprises monitor means for monitoring an image via the lens device, and said signal is information for controlling an image display state by the monitor means.

23. The optical device according to claim 22 wherein said monitor means comprises a function of displaying an image transmitted to the camera from an external device independent of the image via said lens device, and switching of the image by said monitor means is controlled by said information.

24. The optical device according to claim 20 wherein said signal is information for controlling a predetermined function of the camera, and an operation state of the predetermined function of said camera is controlled in response to the information.

25. An optical device for use as a second device in an image signal recording system in which a serial communication of a request command and information is performed between a first device and the second device electrically connected to the first device, and the information is serially transmitted to the first device from the second device based on the request command from the first device via a serial communication line, comprising:
- a signal generating section for forming a signal indicating an operation state of an operation member provided on said second device independent of said request command; and
- a control circuit for transmitting the signal from the signal generating section to said first device via said serial communication line regardless of the request command from said first device, wherein a signal indicating an operation state of an operating member is a serial signal.

26. The optical device according to claim 25 wherein said signal generating section generates said signal by an operation of an operation member provided on said second device.

27. The optical device according to claim 26 wherein said first device is a camera, and the second device is a lens device.

28. The optical device according to claim 27 wherein said camera comprises a recording device for recording a video signal, said predetermined information is information for controlling an operation of the recording device, and said camera controls the operation of the recording device by the information.

29. The optical device according to claim 27 wherein said lens device transmits said predetermined information by the request command from the camera in the serial communication.

30. The optical device according to claim 27 wherein said camera comprises monitor means for monitoring an image via the lens device, and said predetermined information is information for controlling an image display state by the monitor means.

31. The optical device according to claim 30 wherein said monitor means comprises a function of displaying an image transmitted to the camera from an external device independent of the image via said lens device, and switching of the image by said monitor means is controlled by said predetermined information.

32. The optical device according to claim 27 wherein said predetermined information is information for controlling a predetermined function of the camera.

33. A lens device provided with a plurality of terminals, and communication means for transmitting or receiving information with an image signal recording device via a plurality of communication lines, comprising:
- a parallel signal generating section for generating a parallel information; and
- a serial signal generating section for generating a serial information by a digital signal,
- wherein at least one communication line of said plurality of communication lines has a first state for transmitting the parallel information and a second state for transmitting the serial information by a digital signal.

* * * * *